United States Patent [19]
Belmares-Sarabia et al.

[11] Patent Number: 4,763,186
[45] Date of Patent: Aug. 9, 1988

[54] COLOR CORRECTION SYSTEM WITH MONITOR FOR USE IN RECALLING COLOR CORRECTIONS AND CORRESPONDING METHOD

[75] Inventors: Armand Belmares-Sarabia, Catskill, N.Y.; Stanley J. Chayka, Parsippany, N.J.

[73] Assignee: Corporate Communications Consultants, Inc., Fairfield, N.J.

[21] Appl. No.: 943,298

[22] Filed: Dec. 17, 1986

Related U.S. Application Data

[63] Continuation-in-part of Ser. No. 598,468, Apr. 9, 1984, Pat. No. 4,679,067, and a continuation-in-part of Ser. No. 851,164, Apr. 14, 1986.

[51] Int. Cl.$^4$ .................... H04N 9/64; H04N 9/74
[52] U.S. Cl. ........................ 358/22; 358/27; 358/28; 358/80
[58] Field of Search .................. 358/22, 27, 28, 80

[56] References Cited

U.S. PATENT DOCUMENTS

| | | | |
|---|---|---|---|
| 3,255,305 | 6/1966 | Chatten | 358/22 |
| 4,236,174 | 11/1980 | Gall | 358/22 |
| 4,258,385 | 3/1981 | Greenberg et al. | 358/22 |
| 4,285,005 | 8/1981 | Srivastava | 358/28 |
| 4,296,432 | 10/1981 | Engel et al. | 358/28 |
| 4,364,084 | 12/1982 | Akimoto et al. | 358/76 |
| 4,500,919 | 2/1985 | Schrieber | 358/80 |
| 4,525,736 | 6/1985 | Korman | 358/28 |
| 4,698,664 | 10/1987 | Nichols et al. | 358/10 |

Primary Examiner—John W. Shepperd
Attorney, Agent, or Firm—Curtis, Morris & Safford

[57] ABSTRACT

An improved color correction system and method are disclosed. A color corrector may include circuits for selecting a predetermined range of colors around an infinitely selectable principal color and circuits for selectively generating color corrections for the video picture signals which correspond to the predetermined range of colors. The color corrections are then applied to the video picture signals to produce color corrected video picture signals. The color correction may be stored and recalled on a scene-by-scene basis. Two or more such circuits may be employed so that two or more different principal colors can be selected. Preferably, the predetermined range of colors is adjustable. A color corrector may also include circuits for storing and recalling area discrimination signals on a scene-by-scene basis. Moreover, a color corrector may include circuits for identifying the color corrections for a particular scene with a video picture from that particular scene. The video picture for the particular scene is displayed, and the operator may recall the color corrections by using the video picture together with an associated control. More particularly, a miniature reproduction of a frame from each of several prior scenes may be employed to "label38 or "tag" the color corrections for the associated scene. In later scenes, the miniature reproduction may be used to recall the color corrections for the associated scene. The miniature reproductions may be displayed, for instance, on an auxiliary monitor. With this feature, the operator does not have to remember scenes by number, nor is the operator required to run the telecine or tape player backwards to visually select the prior scene whose corrections are to be recalled.

36 Claims, 16 Drawing Sheets

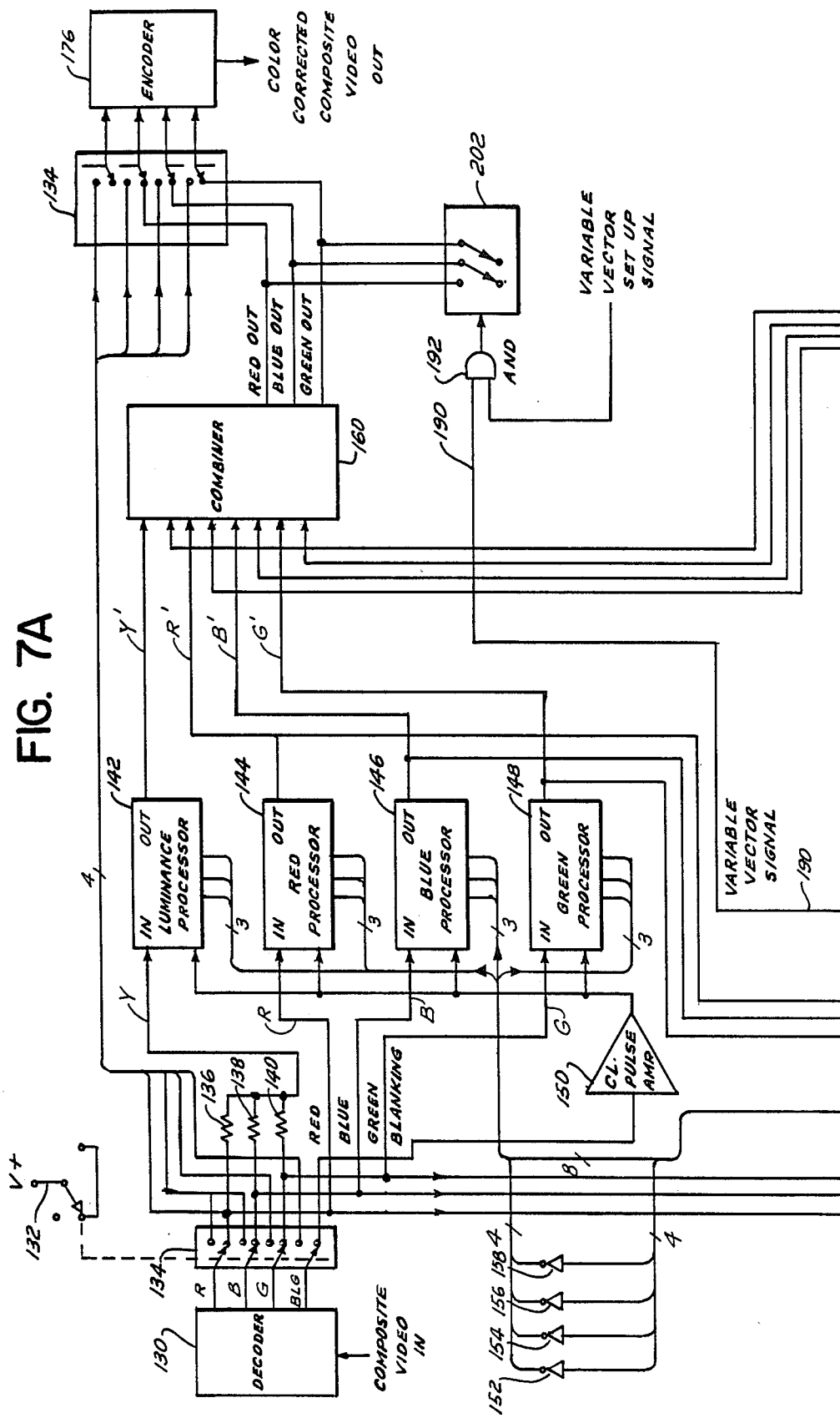

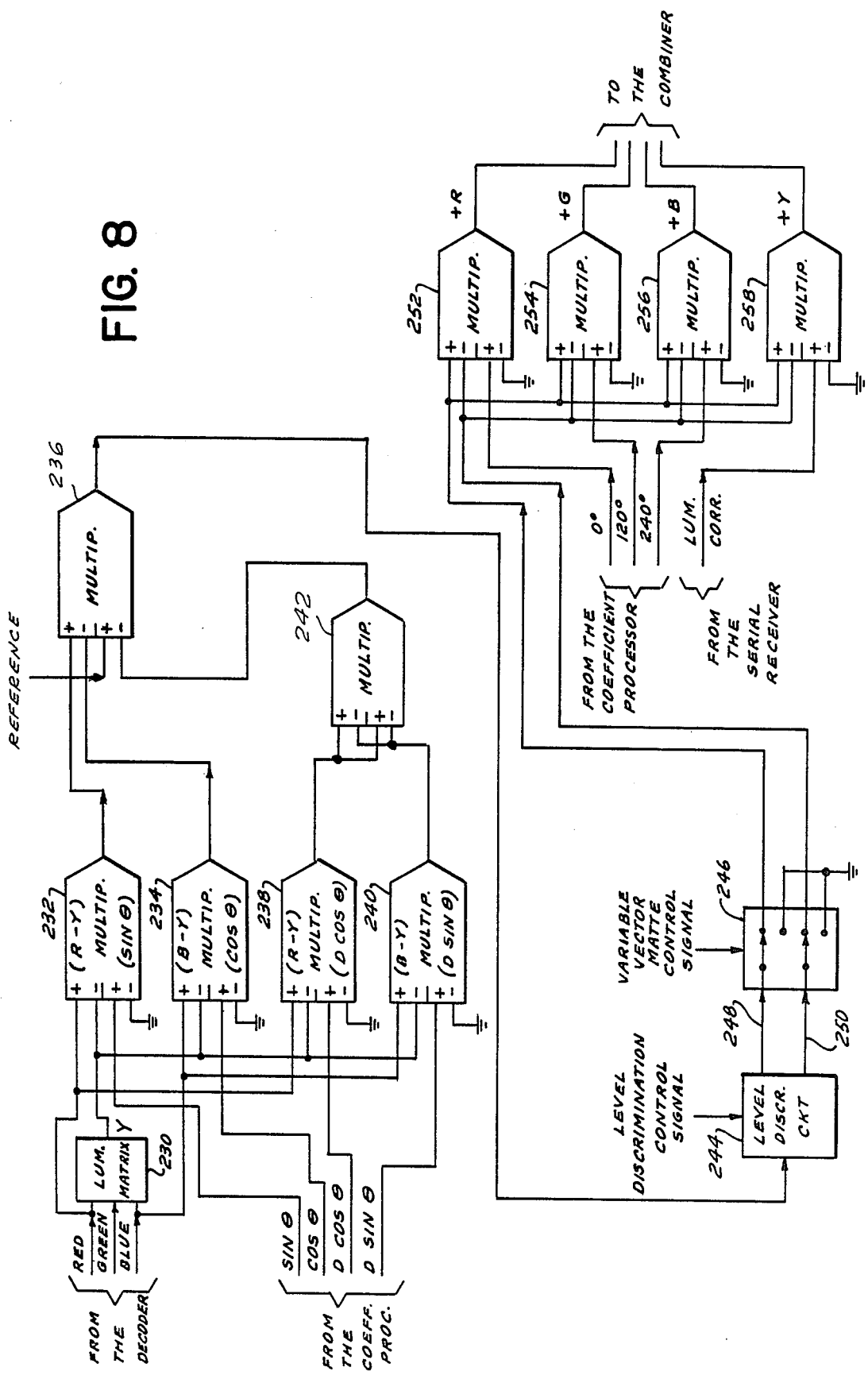

TO FIG. 17B

COLOR CORRECTION SYSTEM WITH MONITOR FOR USE IN RECALLING COLOR CORRECTIONS AND CORRESPONDING METHOD

This application is a continuation-in-part of U.S. patent application Ser. No. 598,468, filed on Apr. 9, 1984, which application issued as U.S. Pat. No. 4,679,067 on July 7, 1987; and a continuation-in-part of U.S. patent application Ser. No. 851,164, filed on Apr. 14, 1986.

BACKGROUND OF THE INVENTION

The invention relates to systems and methods for color correcting video picture signals. More particularly, the present invention pertains to improved systems and methods for increasing the quality and speed of color correction operations. This patent application describes improvements upon the color correction systems and methods disclosed in U.S. Pat. Nos. 4,096,523 (the "Rainbow" patent); 4,223,343 (the "Anamorphic" patent); 4,410,908 (the "Luminance" patent); copending, commonly owned U.S. patent application Ser. Nos. 598,468, entitled "Color Correction System and Method With Localized Color Sampling"; 722,801, entitled "Color Correction System and Method With Scene-Change Detection"; and 807,815, entitled "Editing System and Method." Application Ser. No. 598,468 issued as U.S. Pat. No. 4,679,067 on July 7, 1987, while application Ser. No. 722,801 issued as U.S. Pat. No. 4,694,329 on Sept. 15, 1987. The disclosures of these patents and patent applications are hereby incorporated herein by reference.

There is a continuing need to improve the efficiency, speed, and quality of the color correction of video picture signals, especially in film-to-tape and tape-to-tape transfers, and particularly in scene-by-scene color correction. For instance, there is a need to better isolate particular objects for color correction. Furthermore, there is a need to better select a specific color or a specific range of colors for color correction.

OBJECTS OF THE INVENTION

Accordingly, an object of the invention is to satisfy the above needs and provide a system and method for color correcting video picture signals with increased efficiency, speed, and quality.

Another object of the invention is to provide an apparatus and a method for improving the accuracy with which a specific color or a specific range of colors may be color corrected.

An additional object of the invention is to provide an apparatus and a method for more easily identifying and recalling the color corrections associated with particular scenes in an image recording medium that is to be color corrected.

A further object of the invention is to provide an apparatus and a method for better segregating a particular area of the picture produced by the video picture signals and color correcting this particular area. It is a further object to blend the edges of the area into the remainder of the picture and make the edges less noticeable.

Yet another object of the invention is to provide an apparatus and a method for improving the ability to color correct color signals having certain levels.

SUMMARY OF THE INVENTION

The invention satisfies the needs identified above and meets the foregoing objects by providing an apparatus in which a predetermined range of colors around an infinitely variable principal color are selected. Color corrections for the video picture signals corresponding to the predetermined range of colors are selectively developed, and then the color corrections are applied to the video picture signals, thereby producing color corrected video picture signals. Accordingly, any object in the video picture may be selected based upon its color. Preferably, the size of the predetermined range of colors is adjustable. Therefore, all of the colors in the object may be selected for color correction, even if the object consists of a wide range of colors. However, the range may be adjusted to be very narrow, if the operator so desires, and this can be done substantially independently of the saturation of the colors Thus, the present invention permits particular objects to be selected for color correction based upon their colors. The principal color may be selected from any hue, regardless of the saturation levels. This advantage results in an improvement in the quality of the color corrected videotape. Moreover, this advantage decreases the time, and therefore the cost, of color correcting motion picture film and videotape.

In accordance with a further aspect of the invention, the color corrections for a particular scene are identified or labeled with a video picture from that particular scene. The video picture is displayed for the operator, preferably on an auxiliary monitor screen, or on the main monitor screen. The operator may use the display to recall the color corrections for that particular scene and apply them to the video picture signals for the present scene. Several video pictures may be shown on the same display, and the operator may utilize an array of pushbuttons arranged like the video pictures on the screen or a light pen in order to choose the color corrections to be recalled.

Alternatively, the display may include a "touch screen," and the operator may touch the video picture associated with the desired color corrections in order to recall them. Numerical data giving locations of the corrections for prior scenes preferably are displayed next to the pictures on the auxiliary display. Thus, the operator also can use the numerical correction location information displayed next to each picture to retrieve the associated correction values. The operator does not have to remember the scene number for the particular scene, which may change as the motion picture film or the videotape is edited. This aspect of the invention enables the operator to readily identify, locate, and recall the color corrections he or she desires to work with. Therefore, this aspect of the invention greatly increases the speed with which a motion picture film or a videotape may be color corrected.

In accordance with an additional aspect of the invention, the color corrector may include circuits for discriminating video picture signals based upon their color levels. Specifically, such discrimination circuits may discriminate signals above a predetermined level or signals below a predetermined level or signals between two predetermined levels. Color corrections are selectively developed for the discriminated signals, and the color corrections are applied to the associated video signals to produce color corrected video picture signals.

This aspect of the invention further increases object selectivity and speeds the color correction process.

The features of the invention each increase the efficiency of the color correction process. In addition, when two or more features are used together, even greater efficiency results, such efficiency previously being unattainable.

BRIEF DESCRIPTION OF THE DRAWINGS

The above and other objects, features, and advantages of the present invention will become apparent upon consideration of the following detailed description of illustrative embodiments thereof, especially when taken in conjunction with the accompanying drawings, wherein:

FIGS. 7A–7B are a block diagram of the color correction circuits in a color correction system according to the invention;

FIG. 8 is a block diagram of the variable vector control circuits for a color correction system according to the invention;

DETAILED DESCRIPTION OF THE PREFERRED EMBODIMENTS

General Description

Figure 1:
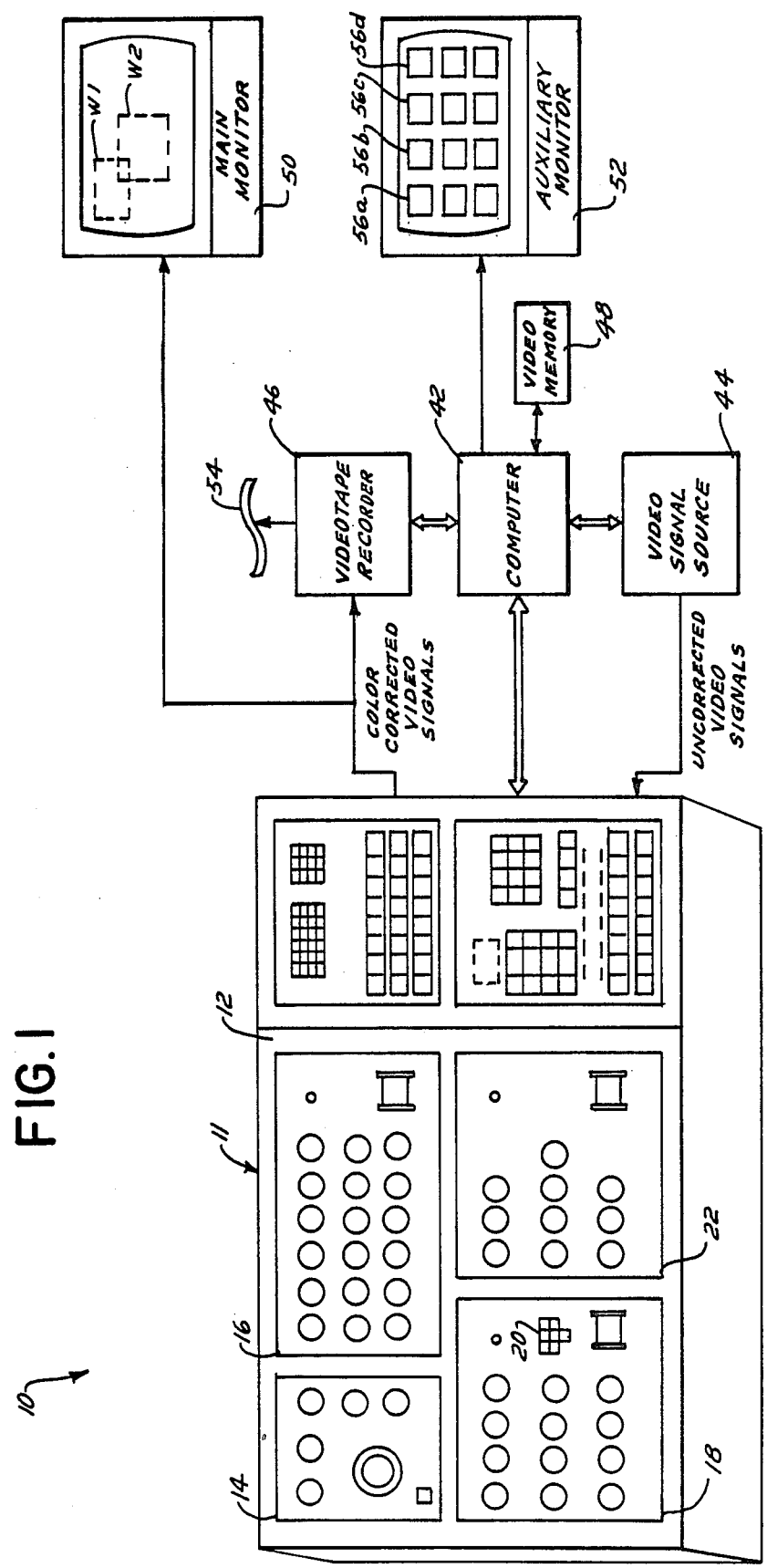
FIG. 1 is a diagrammatic illustration of a color correction system according to the invention.

FIG. 1 shows a color correction system 10 constructed according to the invention. The color correction system 10 includes a color corrector 11 having a front panel 12. Portions of the front panel 12 are illustrated in greater detail in FIGS. 2–4. The front panel 12 has a set of variable vector controls 14 and a set of six vector controls 16. The six vector controls 16 function as outlined in the Rainbow and Luminance patents.

Figure 2:
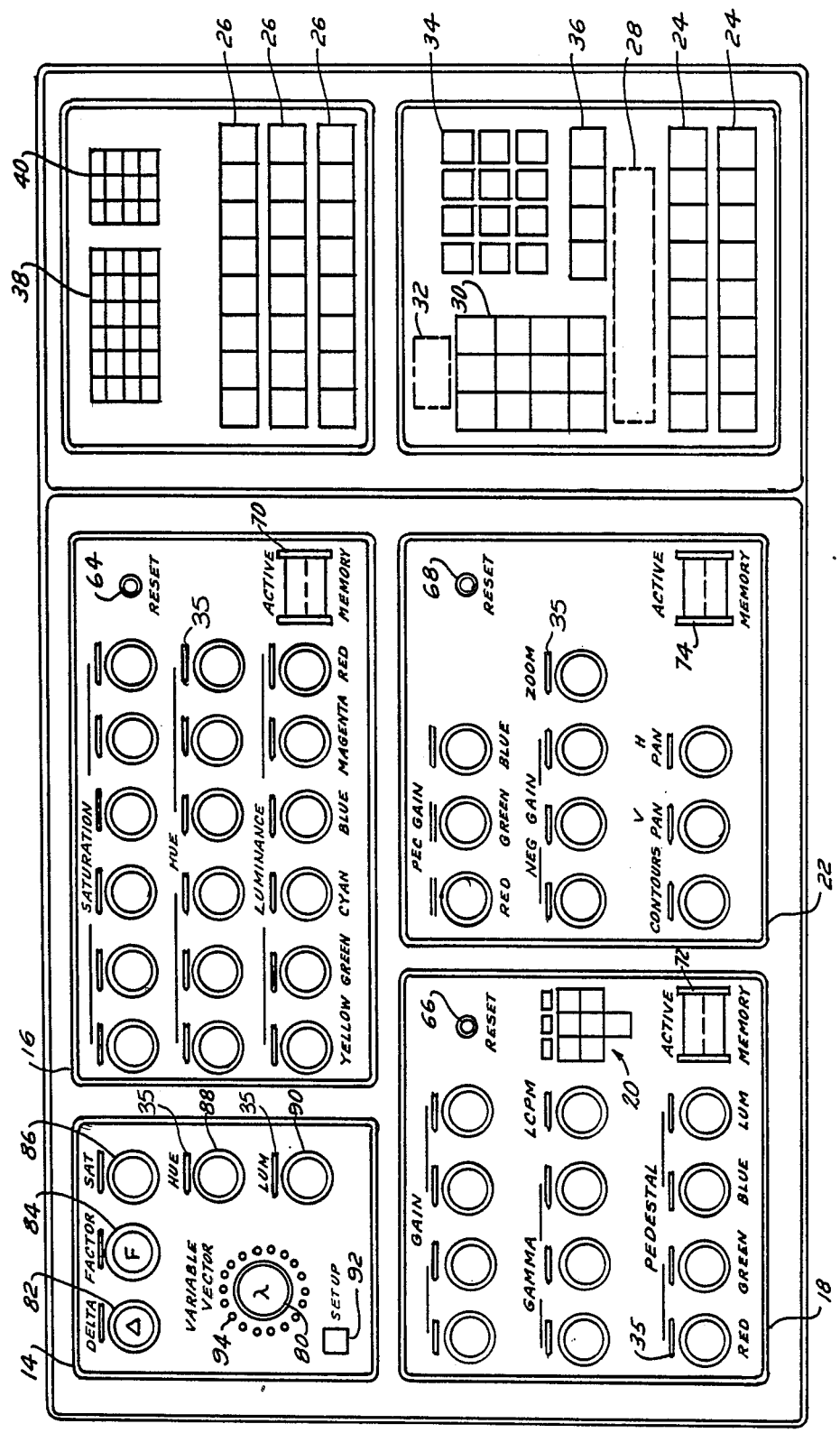
FIG. 2 is a top plan view of the front panel for the color corrector shown in FIG. 1.

Referring now to the lower left-hand portion of FIG. 2, the front panel 12 includes a set of color balance controls 18 and "window" controls 20. The "window" controls 20 are described and depicted in greater detail in U.S. Pat. No. 4,679,067 as well as U.S. Pat. No. 4,694,329. The front panel 12 additionally includes video signal source controls 22. The video signal source controls 22 adjust parameters such as the PEC gain and negative gain for each of the red, green, and blue channels Moreover, the video signal source controls adjust other parameters, for instance, the horizontal pan, the vertical pan, the zoom, and the contours Each of the controls in the sets of controls 14, 16, 18, and 22 includes a control knob which is coupled to a shaft-position encoder, as described in U.S. Pat. Nos. 4,679,067 and 4,694,329.

The right side of the front panel 12 includes pushbuttons and displays. Specifically, this portion of the front panel includes two rows of pushbuttons 24, which are shown in greater detail in FIG. 4, and three rows of pushbuttons 26, which are shown in greater detail in FIG. 3. The functions of many of these pushbuttons are described in the Rainbow and Luminance patents. A display 28 (FIG. 4) shows the scene number for the color corrections stored in the A buffer and the B buffer. Moreover, the display 28 shows the scene number for the current scene.

Figure 4:
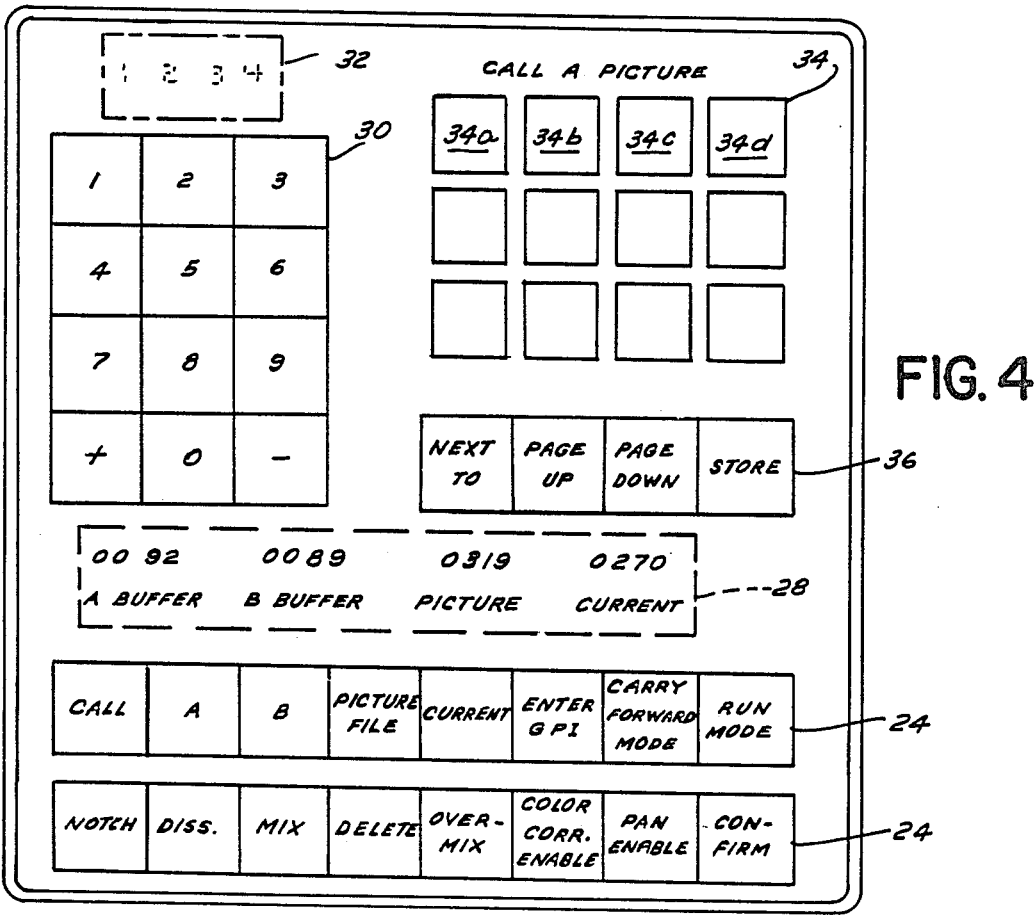
FIG. 4 is an enlarged view of another portion of the front panel shown in FIG. 2.

Still referring to FIG. 4, a keypad 30 and a display 32 are used to recall the color corrections for a particular scene and apply them to the present scene. For example, if the operator wanted to use the color corrections for scene number 1,234 for the current scene, the operator would press the "call" pushbutton in the upper one of the rows 24 and then the buttons 1, 2, 3, and 4 of the keypad 30 in this sequence in order to recall the desired color corrections.

Also shown in FIG. 4 is an array 34 of pushbuttons and a row of pushbuttons 36 for use in the "Call-A-Picture" feature of the invention, which feature is used for recalling color correction signals for previous scenes in another manner. The operation of the "Call-A-Picture" feature will be described in detail below. The portion of the front panel 12 shown in FIG. 3 has waveform pushbuttons and indicators 38 for selecting various waveforms for viewing on an oscilloscope (not shown) as well as monitor selector pushbuttons and indicators 40 for selecting various signals for monitoring.

Referring again to FIG. 1, the system 10 has a computer 42, which is connected to each of the color corrector 11, a video signal source 44, a videotape recorder 46, and a video memory 48. The video signal source 44 may be a film chain or telecine, a videotape player, or the like. The video signal source 44 produces video signals from the associated image recording medium. These video signals are delivered to the color corrector 11 so that they can be corrected. The color corrector 11 provides color corrections for the video signals from the video signal source 44 under the direction of the operator and the computer 42, and it produces color corrected video signals. The color corrected video signals are sent to a main monitor 50, and, at the appropriate time, to the videotape recorder 46. The operator may observe the effect of the color corrections on the video signals by looking at the video picture on the main monitor 50. The videotape recorder 46 records the color corrected video signals on a videotape 54, usually during a second run after color corrections have been made during a first run, thereby producing a color corrected videotape.

The main monitor is shown with windows W1 and W2. The use of the windows W1 and W2, which are movable in size and/or position, is described further below.

An auxiliary monitor 52 is connected to the computer 42. The auxiliary monitor 52 displays a plurality of video pictures, such as the video pictures 56a–56d. The function of the auxiliary monitor 52 and the video memory 48 is described below during the discussion of the "Call-A-Picture" feature.

Referring now to FIG. 2, above each of the control knobs in the sets of controls 14, 16, 18, and 22 is a horizontal linear group 35 of four light-emitting diodes ("LEDs"), which are referred to as "rangefinder" LEDs. The two inner LEDs of each group 35 are green, while the two outer LEDs are red. When the associated control knob is in its center position, the two inner LEDs are energized. If the control knob is turned to the right, the two inner LEDs are deenergized and the rightmost LED is energized. Correspondingly, if the control knob is turned to the left, the two inner LEDs are deenergized, and the leftmost LED is energized. Accordingly, the operator may quickly determine the position of any of the control knobs.

Reset buttons 64, 66, and 68, are provided to permit the operator to readily center the control knobs in the sets of controls 16, 18, and 22, respectively. Specifically, the operator presses a reset button, and all of the control knobs in the associated set of controls are electronically centered by zeroing the counter connected to the control knob. The controls 16, 18, and 22 include active memory pushbutton-indicators 70, 72, and 74, respectively.

Referring now to the lower part of FIG. 4, the "notch" pushbutton sets the scene boundary between scenes; that is, pressing the "notch" button stores the frame number of the first frame of a new scene. The "color correct enable" pushbutton in the same row makes the "notch" pushbutton effective for color correction events. The "pan enable" pushbutton makes the "notch" pushbutton effective for position related events, such as horizontal pans, vertical pans, and zooms.

The "carry forward mode" is entered by pressing the "carry forward mode" pushbutton in the upper row 24. In this mode, the color corrections from the last scene are carried forward for the next scene. That is, once the operator establishes color corrections for a particular scene and then sets the scene boundary between that scene and the next scene, these color corrections are both stored for the particular scene and applied to the next scene. Thus, the operator may use these color corrections as a basis for color correcting the next scene.

The "picture file" pushbutton is used with the video scene recall feature, i.e., the "Call-A-Picture" feature of the invention, which is described below The "picture file" pushbutton enables the array of pushbuttons 34 and the row of pushbuttons 36.

The "diss." pushbutton is used to produce a linear transition between the color corrections for a given scene and the color corrections for the subsequent scene. For example, the operator may make color corrections for a given scene and then make color corrections for the subsequent scene. If the operator wants a smooth transition between scenes, the operator presses the "dissolve" pushbutton at a frame near the end of the given scene and again presses the "dissolve" pushbutton at a frame near the beginning of the subsequent scene. The computer is programmed to automatically provide a linear transition, for instance, on a frame-by-frame basis, between the color corrections for the given scene and the color corrections for the subsequent scene for all frames between the two dissolve points.

Figure 3:
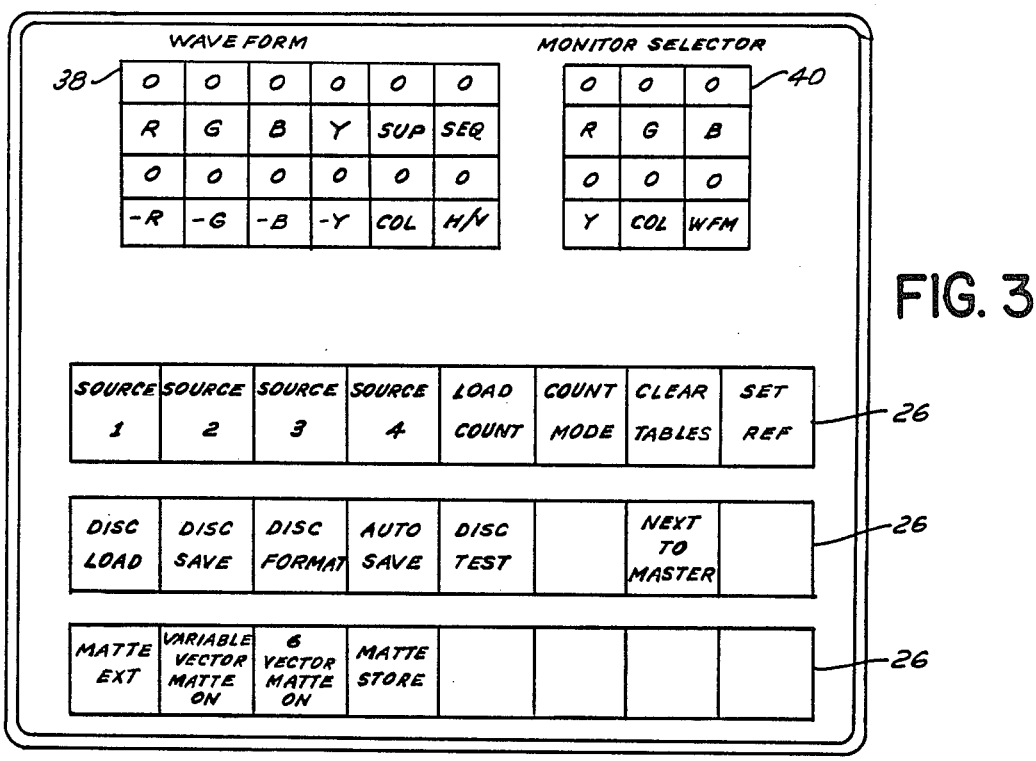
FIG. 3 is an enlarged view of a portion of the front panel shown in FIG. 2.

The "source 1," "source 2," "source 3," and "source 4" pushbuttons, which are shown in row 26a of FIG. 3, enable the operator to select one of a variety of video signal sources For example, the operator may select a telecine as the video signal source by pressing the "source 1" pushbutton, or select a videotape player as the video signal source by pressing the "source 2" pushbutton.

The "load count" pushbutton (next to the "source 4" button) allows the frame counter to be initialized to any number at the beginning of a new job. The "count mode" pushbutton allows the operator to select among various counting modes for the frame counter, such as, counts by hours, minutes, seconds and film frames; or PAL video frames; or NTCS video frames.

The "matte ext," "variable vector matte on," "six vector matte on," and "matte store" pushbuttons are described below during the description of the "Traveling Matte" feature of the invention.

The "disc load," "disc save," "disc format," "auto save," and "disc test" pushbuttons are utilized to control an external storage device (not shown) for the computer, such as a floppy disc drive or a hard disc drive.

Variable Vector Controls

The upper left-hand portion of FIG. 2 illustrates the set of variable vector controls 14. The controls 14 include a variable vector position control 80, a delta control 82, a factor control 84, a saturation control 6, a hue control 88, and a luminance control 90. Furthermore, the variable vector controls 14 include a "set up" pushbutton 92, the function of which is described below. A ring of LEDs 94 is located around the circumference of the variable vector position control 80. The LEDs 94 indicate the angular orientation of the variable vector position control 80. The angular orientation of the variable vector position control 80 corresponds to one of the colors on a vectorscope.

The variable vector position control 80 is used to select a particular range of colors for color correction. The principal color within the range of colors is determined by the angular orientation of the variable vector position control 80. The variable vector position control 80 may be used to select any principal color within the precision of the associated counter. For example, if the associated counter is a 12-bit counter, any one of 4,096 different principal colors may be selected with the variable vector position control 80. Thus, the principal color is essentially infinitely variable.

Figure 5:
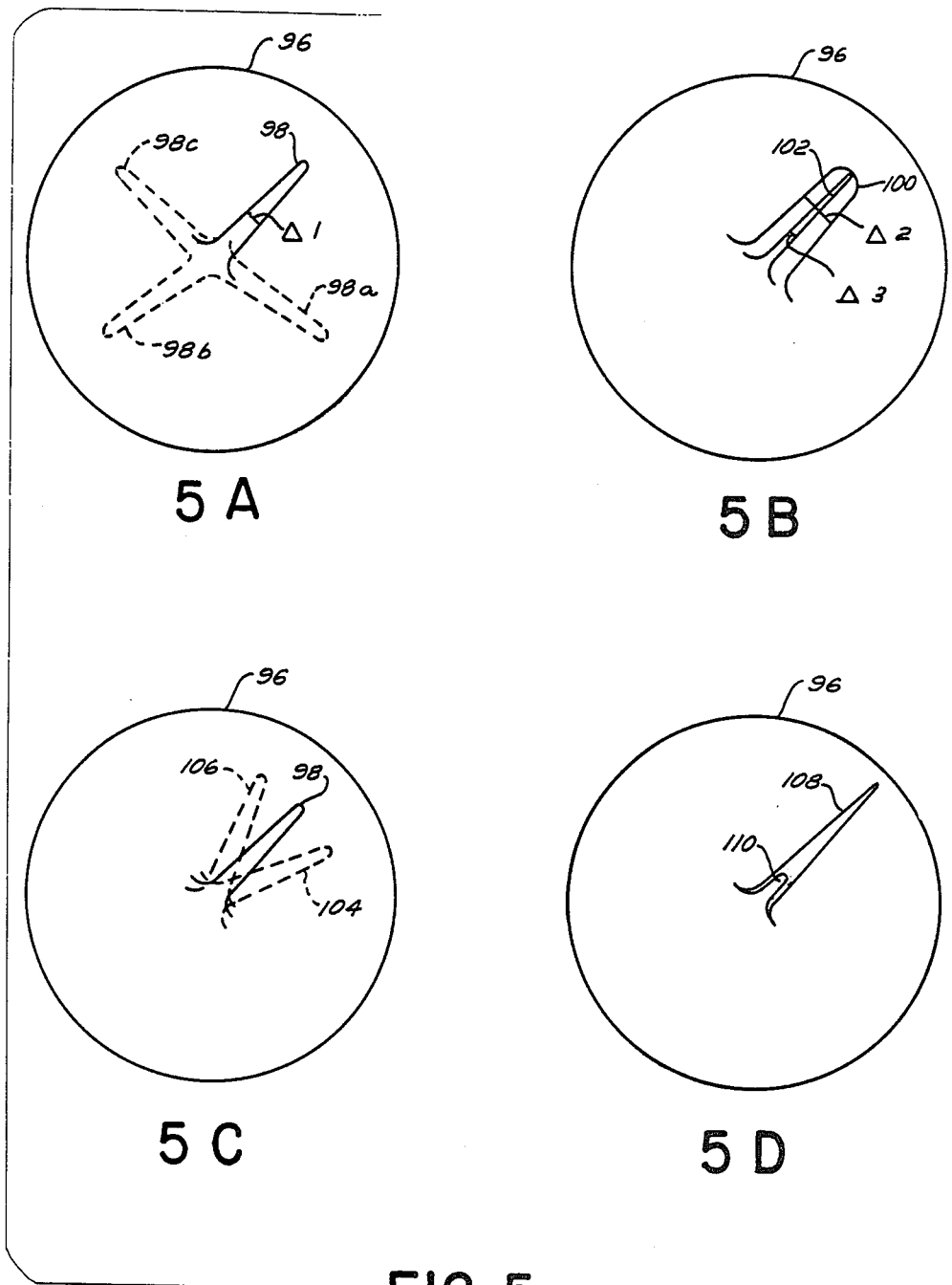
FIGS. 5A–5D are diagrammatic illustrations of waveforms on a vectorscope and depict the functions of the variable vector controls.

The functions of the various controls 80–90 are better explained in conjunction with FIGS. 5A–5D. The circle 96 in FIGS. 5A–5D diagrammatically illustrates a vectorscope screen. The waveform 98 illustrates the response of the variable vector control circuits when the input signal to the color corrector is from a device which generates a spectrum of color signals, that is, a signal whose color varies throughout the visible spectrum. The angular orientation of the waveform 98 corresponds to a given angular orientation of the variable vector position control 80. FIG. 5A shows the effect of turning the variable vector position control 80. For example, if the control 80 is turned clockwise from the position of waveform 98 to select a different principal color, the response of the vectorscope becomes the waveform 98a. Then, if the control 80 is turned further clockwise to select another principal color, the response of the vectorscope becomes the waveform 98b. Similarly, if the control 80 is turned counterclockwise to select yet another principal color, the response of the vectorscope becomes the waveform 98c. Accordingly, the control 80 may be turned to select virtually any hue as the principal color.

The variable vector controls are nominally effective for a predetermined range of colors around the principal color. For example, colors within plus or minus 5 degrees of the principal color will be color corrected along with the principal color; however, the effectiveness of the color corrections will decrease as the angular distance from the principal color increases.

The delta or bandwidth control 82 is provided in order to adjust the width of the predetermined range of colors effected by the variable vector control position control 80. FIG. 5B shows the effect of rotating the delta control 82. The delta control 82 may be rotated clockwise in order to increase the width of the range of colors or rotated counterclockwise in order to decrease the width of the range of colors. Hence, the width of the range of colors may be made as large or as small as the operator desires, within the limits of the equipment. For instance, the width of the range of colors may be changed anywhere from plus or minus about 2 degrees around the principal color to plus or minus 90 degrees around the principal color. FIG. 5B shows a waveform 100 with the same principal color as the waveform 98 but with an increased bandwidth "Δ2." The waveform 100 was obtained by turning the delta control 82 clockwise. FIG. 5B also shows a waveform 102 with the same principal color as the waveform 98 but with a decreased bandwidth "Δ3." The waveform 102 was obtained by turning the delta control 82 counterclockwise.

Once the desired principal color and the desired range of colors around it have been selected with the variable vector position control 80 and the delta or bandwidth control 82, the saturation control 86, the hue control 88, and the luminance control 90 may be employed to generate color correction signals for the video picture signals corresponding to the selected range of colors. More particularly, the hue control 88 is used to alter the colors in the selected range of colors and shift them in the color spectrum, while the saturation control 86 is used to change the levels or intensity of the colors in the selected range of colors. Additionally, the luminance control 90 is utilized to vary the luminance or brightness of the colors in the selected range of colors.

FIG. 5C shows the effect of rotating the hue control 88. To shift the colors in the selected range of colors, the hue control 88 is turned clockwise or counterclockwise. FIG. 5C shows a waveform 104 and a waveform 106. The waveform 104 was produced by turning the hue control 88 clockwise after the waveform 98 was selected. Similarly, the waveform 106 was produced by turning the hue control 88 counterclockwise after the waveform 98 was selected. The hue control may shift the color within the selected range of colors by any desirable amount, within the limits of the equipment. For example, the hue control may be designed to shift the principal color by up to 60 degrees in one direction or the other.

FIG. 5D shows the effect of turning the saturation control 86. The saturation control 86 may be rotated clockwise or counterclockwise to increase or decrease, respectively, the saturation levels of the colors in the selected range of colors. As an example, the waveform 108 illustrates what happens when the saturation control 86 is rotated clockwise once the waveform 98 has been selected. The waveform 108 has a saturation level above that of the waveform 98. The waveform 110 illustrates what happens when the saturation control is rotated counterclockwise once the waveform 98 has been selected. The waveform 110 has a saturation level below that of the waveform 98.

The luminance control 90 may be used to increase or decrease the brightness of the colors within the selected range of colors. Of course, the luminance control 90, the hue control 88, and the saturation control 86 may be employed together to alter the associated parameters of the colors within the selected range of colors. The variable vector control knob 80 and the delta control knob 82 are utilized to set the selected range of colors, as noted above. The factor control 84 is used to select those colors within the selected range of colors that have saturation levels either above or below a specified level. The function of the factor control 84 is described in greater detail below during the description of FIGS. 10 and 11.

As an example of the use of the variable vector controls 14, the color correction of a particular scene will be described. Assume the operator desires to color correct a specific object, such as an apple appearing in a picture on the main monitor 50. The operator initially presses the "set up" pushbutton 92, which is part of the variable vector controls 14. This causes all portions of the picture which have colors within the nominal range of colors set by the variable vector position control 80 to become a neutral gray. If the apple does not become gray, the operator rotates the variable vector position control 80 until the apple becomes gray. If only a portion of the apple becomes gray because the apple contains colors outside of the selected range, the operator rotates the delta control to increase the delta or bandwidth of the selected range until the entire apple becomes gray. This signifies that the colors the operator desires to correct, i.e., the colors forming the apple, are encompassed within the selected range. The operator again presses the "set up" pushbutton 92, and the colors are displayed in an unaltered fashion.

Alternatively, the "set up" button may be connected so that objects with the selected color appear normally on the monitor while objects having other colors appear to be gray. The modifications to FIG. 7A that are necessary to implement this feature are readily apparent to a person having ordinary skill in the art and, therefore, will not be described in detail here.

Now, the operator may turn any or all of the saturation control 86, the hue control 88, or the luminance control 90 in order to adjust the corresponding parameter of the colors within the selected range of colors. For instance, the operator may rotate the hue control 88 to change the color of the apple from a greenish red to red. Once the operator has developed the color corrections with the controls 86, 88, and 90, the operator causes the color corrections to be stored in the computer 42. The storage and retrieval of the color corrections may be accomplished as described in the Rainbow patent. The color corrections are read from the memory in the computer and used to produce the color corrected videotape 54 during the "run" mode.

In this manner, the video picture signals forming the apple may be color corrected to produce a desirable image. With the variable vector controls, the apple may be segregated from any of the other objects in the picture and then color corrected. Accordingly, the variable vector controls permit greater object selectivity during color correction and speed the color correction procedure. That is, an object can be segregated from others having hues very close to that of the selected object, or even from objects having the same hue but a different saturation level. It is believed that the hue of the selected object can be closer to that of other similarly colored objects and still be effectively segregated for color correction purposes than with prior color correction devices. This not only improves the speed of color correction, but makes some color corrections possible for the first time, thus significantly improving the color correction quality.

Video Scene Recall ("Call-A-Picture") Feature

Referring now to FIG. 4, pushbuttons 34 and 36, together with the auxiliary monitor 52 shown in FIG. 1, may be used to implement the video scene recall or "Call-A-Picture" feature of the invention. This feature gives a miniature reproduction on the monitor 52 of a frame from each of several prior scenes which have been color-corrected. This allows the operator to visually select the prior scene whose corrections are to be recalled without running the telecine or tape player backwards or using slow prior methods.

Figure 6:
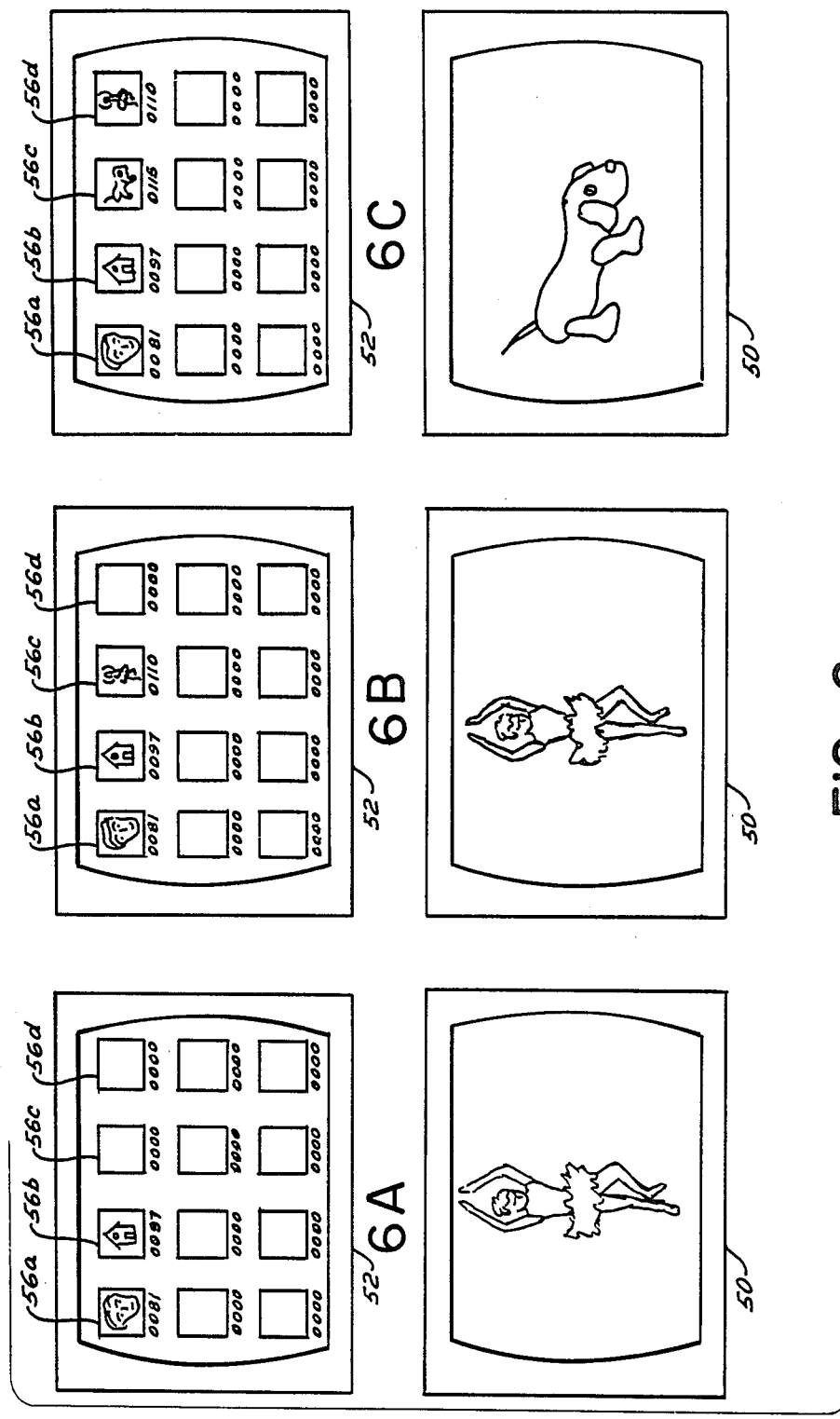
FIGS. 6A–6C are enlarged views of the auxiliary monitor and the main monitor for the color correction system shown in FIG. 1.

In the specific preferred embodiment shown in the drawings, the auxiliary monitor 52 displays up to twelve different video pictures, such as the video pictures 56a-56d shown in FIGS. 1 and 6. The twelve video pictures are displayed in an array with four columns and three rows. Each of the twelve video pictures corresponds to one of the twelve pushbuttons 34 shown in FIGS. 2 and 4. Each video picture is associated with the color corrections for the scene which includes that video picture, and each pushbutton 34 is associated with one of the video pictures. Specifically, the pushbuttons 34a-34d correspond to the video pictures 56a-56d, respectively. The pushbuttons correspond to the video pictures based upon their placement in the associated array.

When the operator desires to recall the color corrections for the scene with the video picture 56b, for example, the operator presses the pushbutton 34b, and those color corrections are recalled and applied to the output of the video signal source 44. The information for producing the video pictures on the auxiliary monitor is stored in the video memory 48. This information is recalled and directed to the auxiliary monitor under the control of the computer 42. The video memory 48 can be any commercially available video picture storage device. One such device which has been used successfully is the Model ICB Image Capture Board sold by AT&T, which is a digital device for storing and retrieving video picture signals.

The video scene recall feature of the invention enables the operator to quickly and easily determine and recall particularly useful color corrections. The operator does not have to remember what scene corresponds to the contents of buffer A or what scene corresponds to the contents of buffer B. Moreover, the operator does not have to think of a name for the color corrections for a given scene and type it onto a display or write it down somewhere. This feature of the invention presents the operator with an easily recognizable label for specific color corrections. Thus, the operator is better able to recall and utilize previous color corrections. As a result, the time necessary for color correcting a videotape is shortened. The video scene recall feature is an alternative to the use of the "call" pushbutton and the keyboard 30 for recalling previous color corrections.

FIGS. 6A-6C show the main monitor 50 and the auxiliary monitor 52 on a larger scale than in FIG. 1. FIG. 6A illustrates the auxiliary monitor 52 after the operator has identified the color corrections for two previous scenes. The operator has used video pictures 56a and 56b for the identification of the color corrections. In particular, the operator has identified the color corrections for scene 0081 with a video picture corresponding to a person's face, and the operator has identified the color corrections for scene 0097 with a video picture corresponding to a house. A different video picture, i.e., a video picture from the current scene, is displayed on the main monitor 50 in the lower left hand corner of FIG. 6. The operator determines the color corrections for the current scene, as set forth above and in the Rainbow patent, and now wishes to identify those color corrections for later use. The operator simply presses the "store" pushbutton, which is located in the row of pushbuttons 36 (FIG. 4), and then the operator presses the pushbutton 34c.

FIG. 6B illustrates what happens after the operator presses these pushbuttons. The picture on the main monitor 50 is displayed on the auxiliary monitor as the video picture 56c, which corresponds to the pushbutton 34c, and the scene number for the present scene, i.e., 0110, is displayed in the auxiliary display below the video picture 56c. At any later time the operator may press the pushbutton 34c, and the color corrections for scene 0110 will be recalled and applied to the then current scene.

The operator is not required to use the video pictures on the auxiliary monitor 52 and the pushbuttons 34 to identify the color corrections in any specific order. For example, the operator could have pressed the button 34d in order to identify the color corrections for the current scene. If the operator had done so, the video picture of the dancer would have been displayed in location 56d instead of location 56c.

FIG. 6C depicts a variation of the video scene recall feature of the invention. If the operator wishes to compare the color corrections for two given scenes, the operator may press the "next to" pushbutton, which is located in the row of pushbuttons 36 in FIG. 4. As an example, assume that the operator has identified the color corrections for three scenes as shown by the auxiliary monitor 52 in FIG. 6B and that the operator has pressed the pushbutton 34b to apply the corresponding color corrections stored for scene 0097 to the current scene shown in the lower right hand portion of FIG. 6. Now, the operator desires to compare the effect of the color corrections for the current scene, i.e., scene 0115, with the effect of the color corrections for scene 0097. The operator simply presses the "next to" pushbutton. As it is shown in FIG. 6C, the picture of the dog on the main monitor 50 is then displayed next to the picture for scene 0097 on the auxiliary monitor, and the picture that was in location 56c is automatically moved to location 56d. Consequently, the operator may readily compare the color corrections for scene 0097 with the color corrections for scene 0115 on the auxiliary monitor 52. If the operator wishes to examine the color corrections for these two scenes on a larger scale, the operator may use the "next to master" pushbutton, which is shown in FIG. 3, thereby causing the two video pictures to be displayed simultaneously side-by-side on the master monitor 50.

Of course, either video picture can be shown alone on the master monitor 50. The ability to thus display a prior scene or frame on the master monitor 50 without running the telecine or tape player back saves wear and tear on the film or tape and minimizes damage due to scratching.

As a further variation, it should be understood that the identification frames of prior scenes can be selectively called up from the video memory and displayed on the master monitor 50 instead of the auxiliary monitor. The array of identification frames can be displayed in part of the screen while the current scene is displayed on the rest of the screen, or the full array of identification frames The video memory 48 contains sufficient storage for the twelve video pictures 56 on the auxiliary monitor 52. If the identification of color corrections for more than twelve scenes is desired, the video memory 48 may contain additional storage for the additional video pictures. That is, the video memory 48 may contain additional pages of memory. In order to move from one page of the video memory, with an associated display of up to twelve video pictures on the auxiliary monitor, to another page of video memory, with a different display of up to twelve video pictures on the auxiliary monitor, the "page up" and "page down" pushbuttons are employed The "page up" and "page down" pushbuttons are located in the row of pushbuttons 36 in FIG. 4.

Figure 16A:
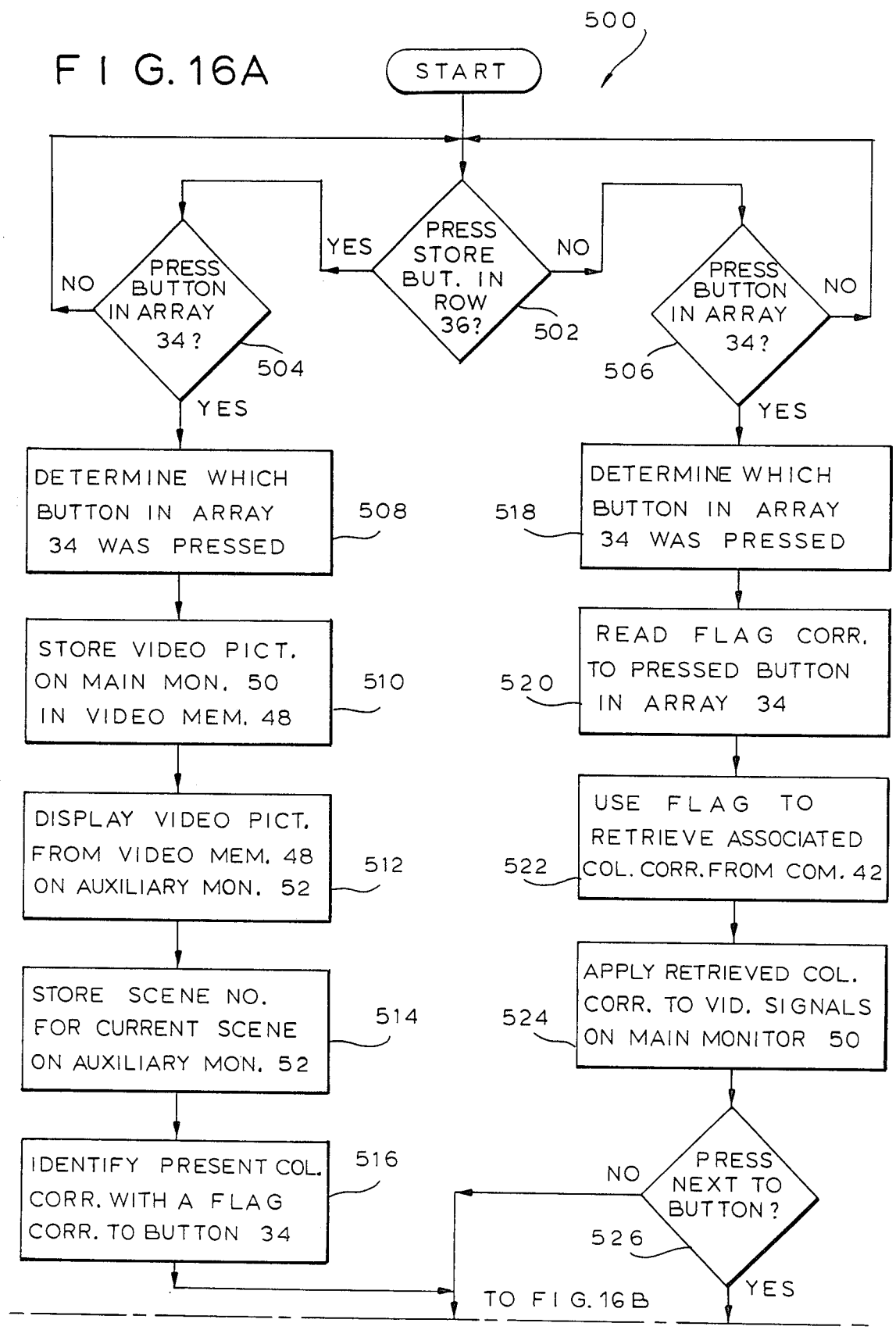
FIGS. 16 and 17 are flowcharts of steps in computer programs that may be employed to implement the "Call-A-Picture" feature of the invention.
Figure 16B:
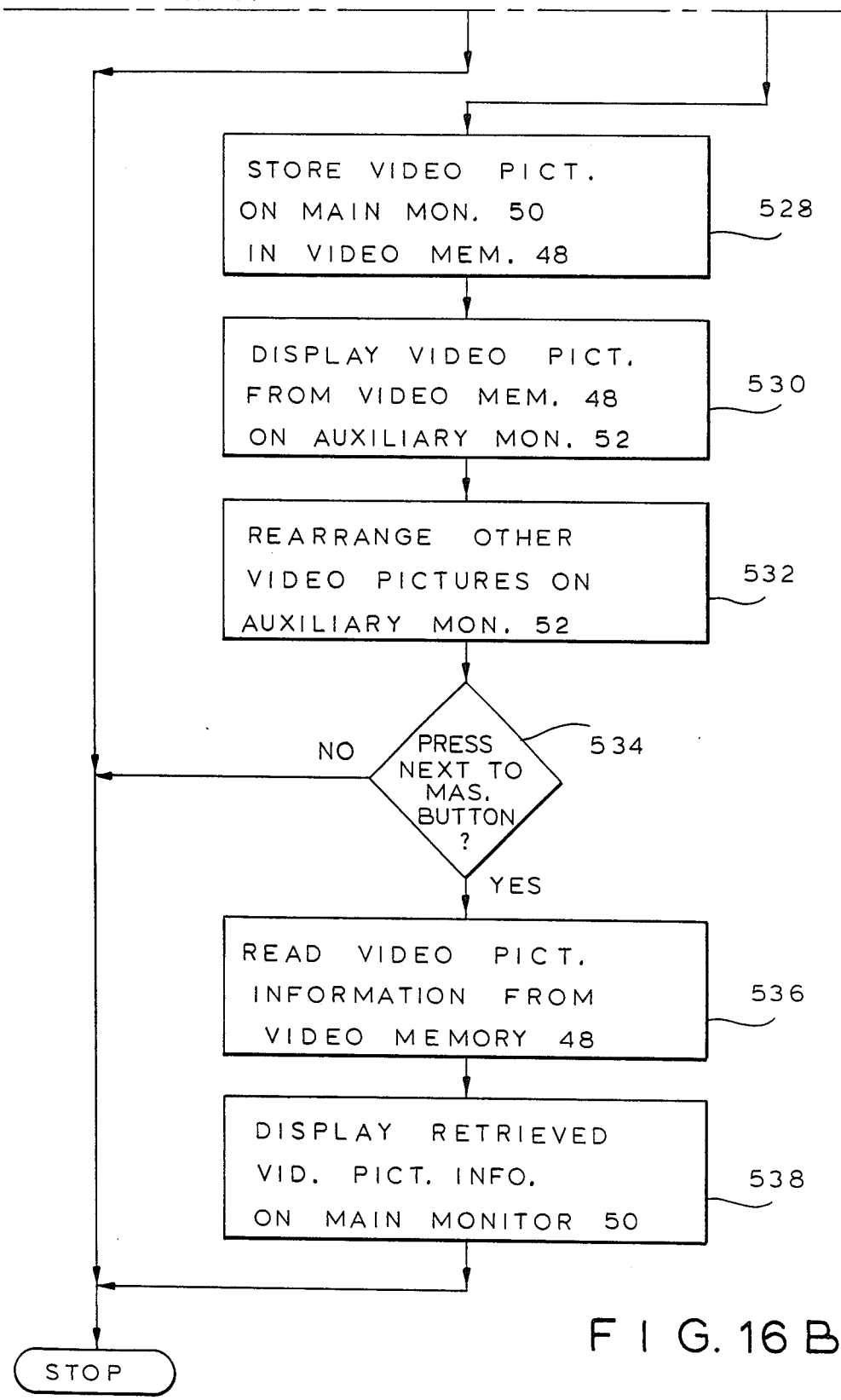

FIG. 16 of the drawings is a flowchart illustrating a computer program used to operate the "Call-A-Picture" feature of the invention. The routine is generally designated by the reference numeral 500.

Initially, the routine checks to ascertain whether the "store" button in the row 36 (FIGS. 2 and 4) has been pressed, as indicated at 502. If so, the routine then checks to determine whether a button in the array 34 of buttons has been pressed, as denoted at 504. However, if the "store" button in the row 36 has not been pressed, the routine simply inquires whether a button in the array 34 (FIGS. 2 and 4) has been actuated, as indicated at 506. The left branch of the flowchart in FIG. 16, starting with the decision block 504, may be considered as a "write" mode since video picture information is stored during this mode. Correspondingly, the right branch of the flowchart in FIG. 16, starting with the decision block 506, may be considered as a "read" mode since video picture information is recalled during this mode.

Once the "store" button (FIG. 4) and a button in the array 34 (FIG. 4) have been pressed, the routine determines specifically which button in the array 34 was actuated, as shown at 508. Then, the routine stores the video signals for the video picture appearing on the main monitor 50 (FIG. 1) in the video memory 48 (FIG. 1), as illustrated at 510. Subsequently, the routine displays a video picture from the video memory 48 (FIG. 1) on the auxiliary monitor 52 (FIG. 1) in the location 56 (FIGS. 1 and 6) corresponding to the button in the array 34 that was just actuated, as indicated at 512. In addition, the routine stores the scene number for the current scene on the auxiliary monitor 52 in the numerical display directly beneath the appropriate location 56, as depicted at 514.

Moreover, the routine identifies the color corrections for the current scene with a flag corresponding to the button in the array 34 that was just pressed, as shown at 516. This flag will be used during the "read" mode in order to access these color corrections and recall them from the computer 42 (FIG. 1). For example, a button in the array 34 of buttons may be identified with a flag through the use of a suitable subroutine. A person having ordinary skill in the art would understand that various techniques may be employed to accomplish this task. Consequently, such steps will not be discussed here in detail.

Referring now to the right branch of the routine illustrated in FIG. 16, i.e., the steps used in the "read" mode, this mode is entered by simply pressing a button in the array 34 of buttons (FIGS. 2 and 4), as shown by the decision block 506. Once this mode has been entered, the routine determines specifically which button in the array 34 was actuated, as indicated at 518. The routine then reads the flag corresponding to the button that was just pressed, as illustrated at 520.

Next, the routine uses the flag to retrieve the associated color corrections from the computer 42 (FIG. 1), as depicted at 522. For instance, a suitable subroutine may be called and utilized to retrieve the color corrections for the previous scene from the computer 42. A person having ordinary skill in the art would understand that various techniques may be employed to accomplish this task. Accordingly, such steps will not be discussed here in detail.

After the color corrections for the previous scene have been retrieved from the computer 42 (FIG. 1), they are applied to the uncorrected video signals from the video signal source 44 (FIG. 1), as denoted at 524, to produce color corrected video signals. These color corrected video signals are delivered to the main monitor 50 (FIG. 1), which then displays a color corrected picture.

Referring again to the right branch of the routine shown in FIG. 16, the blocks below block 524 depict additional aspects of the "Call-A-Picture" feature of the invention.

Namely, the routine inquires whether the "next to" button in the row 36 of buttons (FIG. 4) has been pushed. If not, no further action is taken by the routine. However, if the "next to" button has been actuated, the routine stores the video signals for the video picture appearing on the main monitor 50 (FIG. 1) in the video memory 48 (FIG. 1), as designated at 528. The video picture on the main monitor 50 shows the effects of the recalled color corrections for the previous scene after they have been applied with or without modifications to the present scene. Specifically, the color corrections obtained through the steps shown by blocks 518, 520, 522, and 524 are applied to the video picture for the current scene, and then this color corrected video picture is stored in the video memory 48, as indicated at 528.

Subsequently, the routine displays the video picture that was just stored in the video memory 48 on the auxiliary monitor 52 (FIG. 1), as illustrated at 530. This video picture is displayed in a location 56 (FIGS. 1 and 6) that is adjacent to the location 56 corresponding to the button in the array 34 that was pressed to enter the "read" mode. The routine also rearranges the other video pictures on the auxiliary monitor 52, as shown at 532, if necessary, in order to properly position the miniaturized video picture for the present scene.

Blocks 534, 536, and 538 in FIG. 16 illustrate an additional aspect of the "Call-A-Picture" feature of the invention. Starting with the decision block 534 in the lower right-hand portion of FIG. 16, the routine ascertains whether the "next to master" button in the middle row 26 of buttons (FIG. 3) has been pushed. If not, the routine takes no further action. However, if the "next to master" button has been actuated, the routine reads the video picture information for two video pictures from the video memory 48 (FIG. 1), as indicated at 536. Namely, the video picture information for the picture that was stored during the steps designated by block 530 is read from the video memory 48, as is the video picture information for the location 56 corresponding to the button in the array 34 that was pressed to enter the "read" mode. The retrieved video picture information is displayed on the main monitor 50 (FIG. 1), as shown at 538. Accordingly, the operator may observe the effects of certain color corrections on both the present scene and a prior scene, and, as noted previously, these color corrections may be modified when they are applied to the present scene. This observation may be made on the main monitor 50 through the use of the "next to master" button in order to enable the operator to clearly view the two video pictures on an enlarged scale.

Figure 17A:
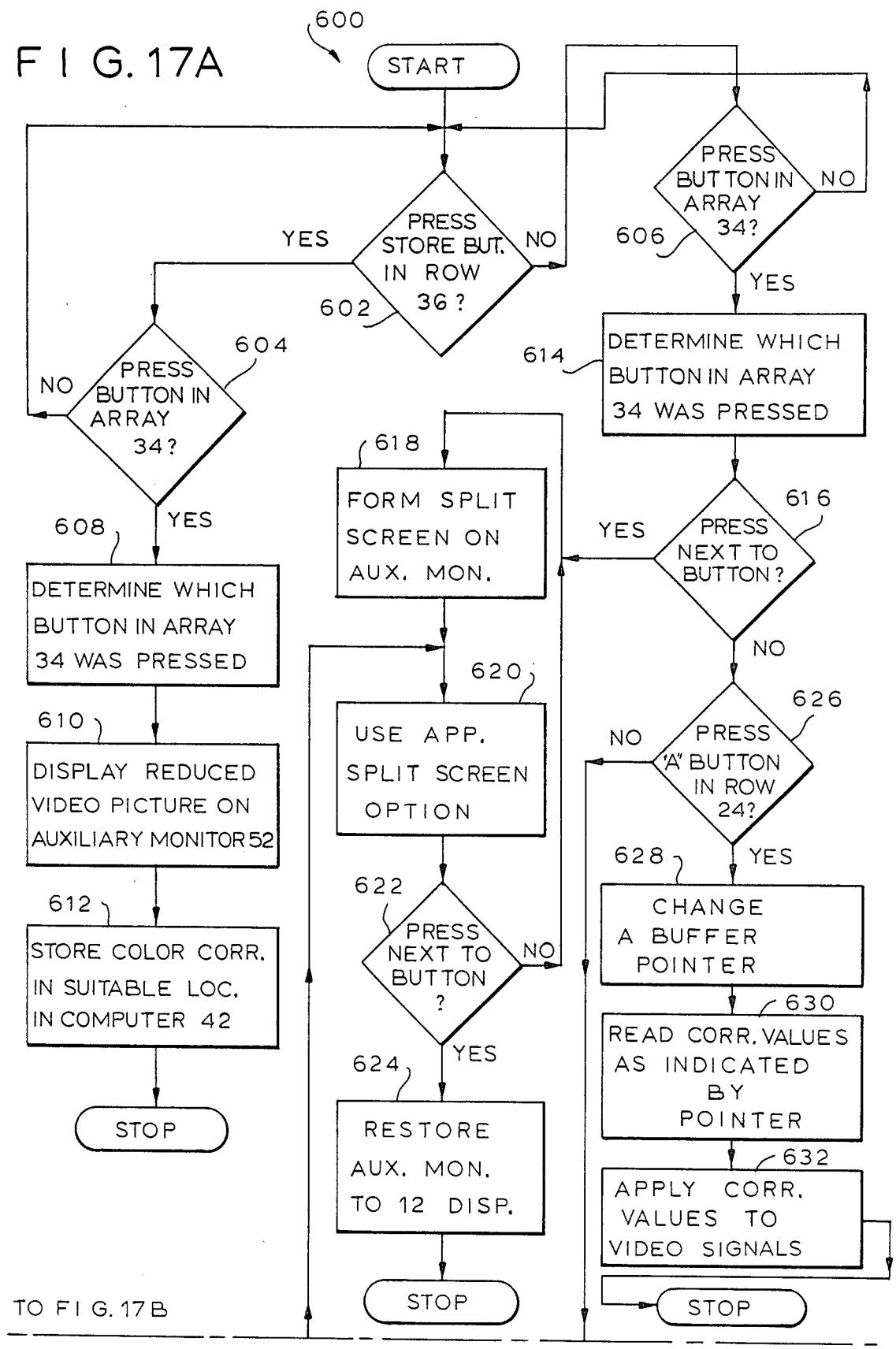
Figure 17B:
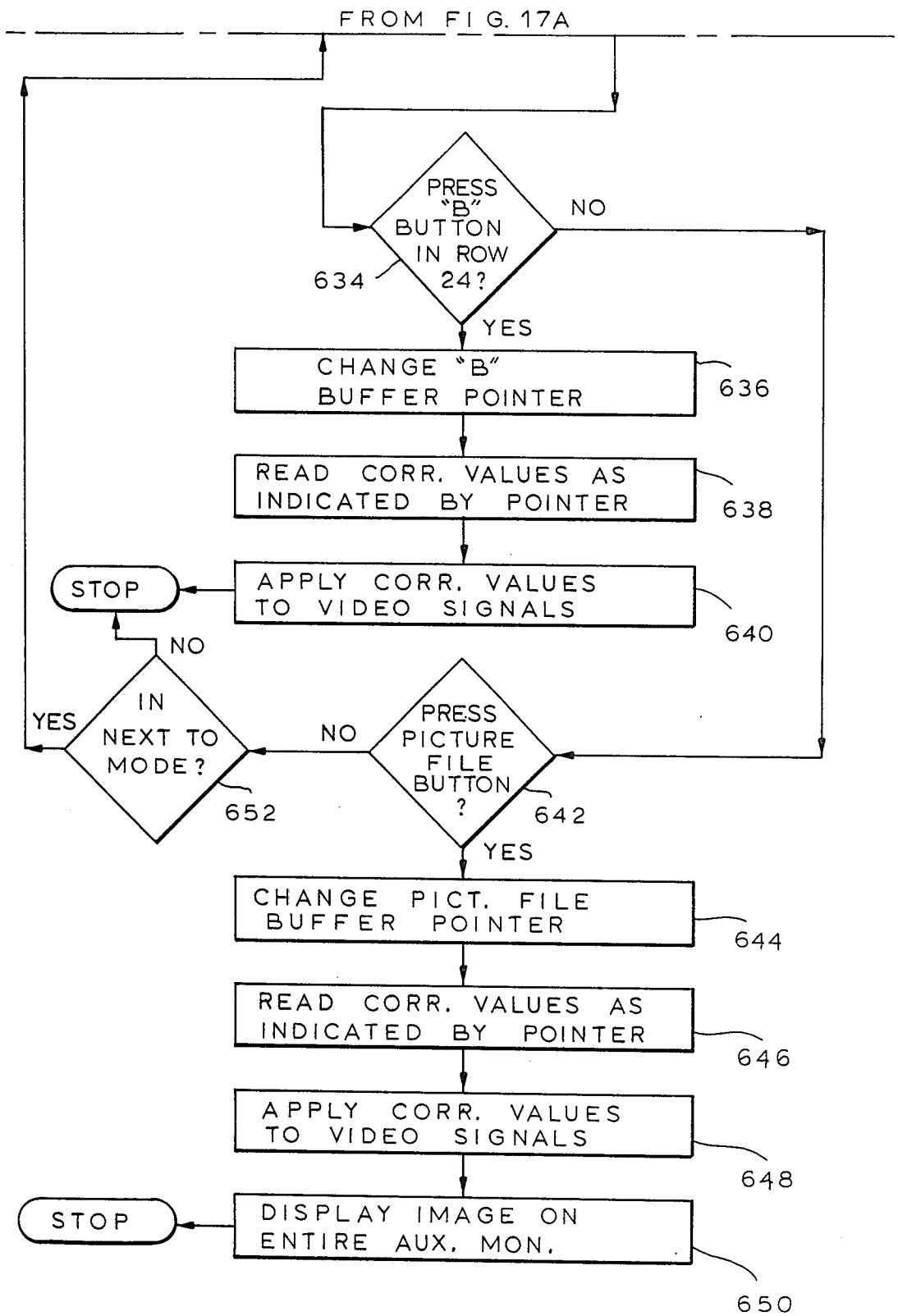

FIG. 17 of the drawings is a flowchart illustrating another computer program that may be used to operate the "Call-A-Picture" feature of the invention. The routine is generally designated by the reference numeral 600.

Initially, the routine checks to determine whether the "store" button in row 36 (FIGS. 2 and 4) has been pressed, as indicated at 602. If so, the routine then checks to determine whether a button in the array 34 of buttons (FIGS. 2 and 4) has been actuated, as denoted at 604. However, if the "store" button has not been pressed, the routine just inquires whether a button in the array 34 has been actuated, as indicated at 606. As in the flowchart of FIG. 16, the left branch of the flowchart of FIG. 17 may be considered as a "write" mode, while the right branch of the flowchart may be considered as a "read" mode.

After the "write" mode has been entered by pressing the "store" button and then by pressing one of the buttons in the array 34, the routine determines exactly which button in the array 34 was pressed, as denoted at 608. The routine next displays the video picture from the main monitor 50 (FIG. 1) in a reduced form on the auxiliary monitor 52 (FIG. 1), as shown at 610. The reduced video picture is displayed in the location corresponding to the button in the array 34 that was just actuated. The routine then stores the present color corrections in a suitable location in the memory of the computer 42 (FIG. 1), as illustrated at 612. Specifically, a number of memory locations in the computer 42 have been allocated for the miniaturized video pictures that may be displayed on the auxiliary monitor 52. The storage step shown at 612 causes the present color corrections to be stored in the memory location corresponding to the button in the array 34 that was just pressed. This storage step is the last task performed in the "write" mode.

Referring now to the right branch of the routine illustrated in FIG. 17, i.e., to the steps used in the "read" mode, this mode is entered merely by pressing a button in the array 34 of buttons (FIGS. 2 and 4), as shown by the decision block 606. Once this mode has been entered, the routine determines exactly which button in the array 34 was pressed as denoted at 614.

The routine then inquires whether the "next to" button in the row 36 (FIG. 4) has been pushed, as denoted at 616. If so, the routine forms a split screen on the auxiliary monitor 52, as indicated at 618. Subsequently, the routine checks which of several split screen options has been selected by the operator and then uses the appropriate split screen option to divide the display on the auxiliary monitor 52, as indicated at 620. For example, the screen of the auxiliary monitor may be divided into left and right halves, or into top and bottom halves. Additionally, the screen may be divided into three sections, with one video picture appearing in the center section and another video picture appearing in the two sections bordering the center section. Furthermore, the dividing line between the two portions of the screen may be positioned as desired by the operator.

The routine then ascertains whether the "next to" button has again been pressed, as indicated at decision block 622. If not, the routine repeats the steps in blocks 618 and 620. If the "next to" button has again been pressed, the routine restores the normal twelve-picture display on the auxiliary monitor 52, as shown at 624.

Referring to the right branch of the flowchart of FIG. 17, if the routine is in the "read" mode and the "next to" button has not been actuated, the routine inquires whether the "A" button or the "B" button or the "picture file" button in the upper row of buttons 24 (FIG. 4) has been pressed, as indicated by the decision blocks 626, 634, and 642.

When the "A" button is actuated during the "read" mode, the routine changes the pointer associated with the "A" buffer, as designated at 628. That is, the routine causes the pointer for the "A" buffer to assume a value corresponding to the memory location in the computer 42 associated with the button in the array 34 that was pressed to enter the "read" mode. Then, the routine uses the pointer to read the appropriate color corrections from the computer 42, as illustrated at 630. The routine next applies these recalled color corrections to the uncorrected video signals from the video signal source 44, as indicated at 632, to produce color corrected video signals, which are displayed on the main monitor 50.

If the "A" button has not been pressed during the "read" mode, the routine inquires whether the "B" button has been pressed, as denoted at 634. If so, the routine carries out substantially the same steps as shown in the blocks 628, 630, and 632, in the blocks 636, 638, and 640.

If the "A" button and the "B" button have not been pressed during the "read" mode, the routine determines whether the "picture file" button in the upper row of buttons 24 (FIG. 4) has been actuated This step is illustrated by the decision block 642. The purpose of the "picture file" button is to cause the selected miniature video picture in the twelve-picture display to be displayed over the entire area of the auxiliary monitor. Accordingly, when the "picture file" button has been pressed during th "read" mode, the routine changes the pointer for the "picture file" buffer, as designated at 644. The steps used to carry out the function denoted at block 644 are essentially the same as the steps used to carry out the functions denoted at the blocks 628 and 636. After the pointer has been changed, the routine uses the pointer to read the appropriate color corrections from the computer 42, as shown at 646. These retrieved color corrections are then applied to the uncorrected video signals from the video signal source 44, as indicated at 648, to produce color corrected video signals, which are displayed on the main monitor 50. Additionally, the routine displays the video picture associated with the button in the array 34 that was pressed to enter the "read" mode over the entire area of the auxiliary monitor 52, as illustrated at 650. In other words, the auxiliary monitor 52 shows the selected video picture on an enlarged scale, i.e., on a scale like that of the main monitor 50.

If neither the "A" button nor the "B" button nor the "picture file" button has been pressed during the "read" mode, the routine inquires whether the equipment is in the "next to" mode, as indicated at 652. The "next to" mode is entered by once pressing the "next to" button. If so, the routine again checks which of several split screen options has been selected by the operator and then uses the appropriate split screen option to divide or redivide the display on the auxiliary monitor 52. This step is designated at 620.

The "next to" button as described above in connection with the flowchart of FIG. 17 permits the operator to compare two full-size video pictures simultaneously on the auxiliary monitor. This is accomplished with a split screen. One video picture was previously stored and is now being recalled, while the other video picture is identical to the video picture on the main monitor. However, the video signals used to produce the latter video picture are subjected to essentially the same type of signal processing as the video signals used to produce the former video picture. In other words, the video signals producing the picture on the main monitor are initially converted into digital signals and subsequently converted back to analog signals. This signal processing technique results in pictures on the auxiliary monitor that are affected in the same way by the digitizing process. Thus, the operator is better able to observe the effects of certain color corrections on the present scene as compared to the prior scene. Furthermore, the use of two full-size video pictures permits the operator to better match the telecine position and/or size adjustments for the present scene with the prior scene.

The switching between the two video pictures on the auxiliary monitor may be accomplished while the signals are in their digital form. Consequently, differential distortions arising from conventional analog switching circuits, e.g., wiping circuits, are eliminated.

The video picture storage technique described above in connection with FIG. 17, i.e., the technique in which specific memory locations in the computer 42 are allocated for color corrections associated with the miniature video pictures on the auxiliary display, may be thought of as "video scratch-pad memory." That is, the color corrections stored in the allocated memory locations are not necessarily related to color correction events. These color corrections may be accessed at random, with the miniature video pictures on the auxiliary display being useful to remind the operator of what these color corrections relate to. This feature permits the operator, on a random basis, to store and recall color corrections that were originally created on a temporary basis

Color Correction Circuit Block Diagram

Figure 7B:
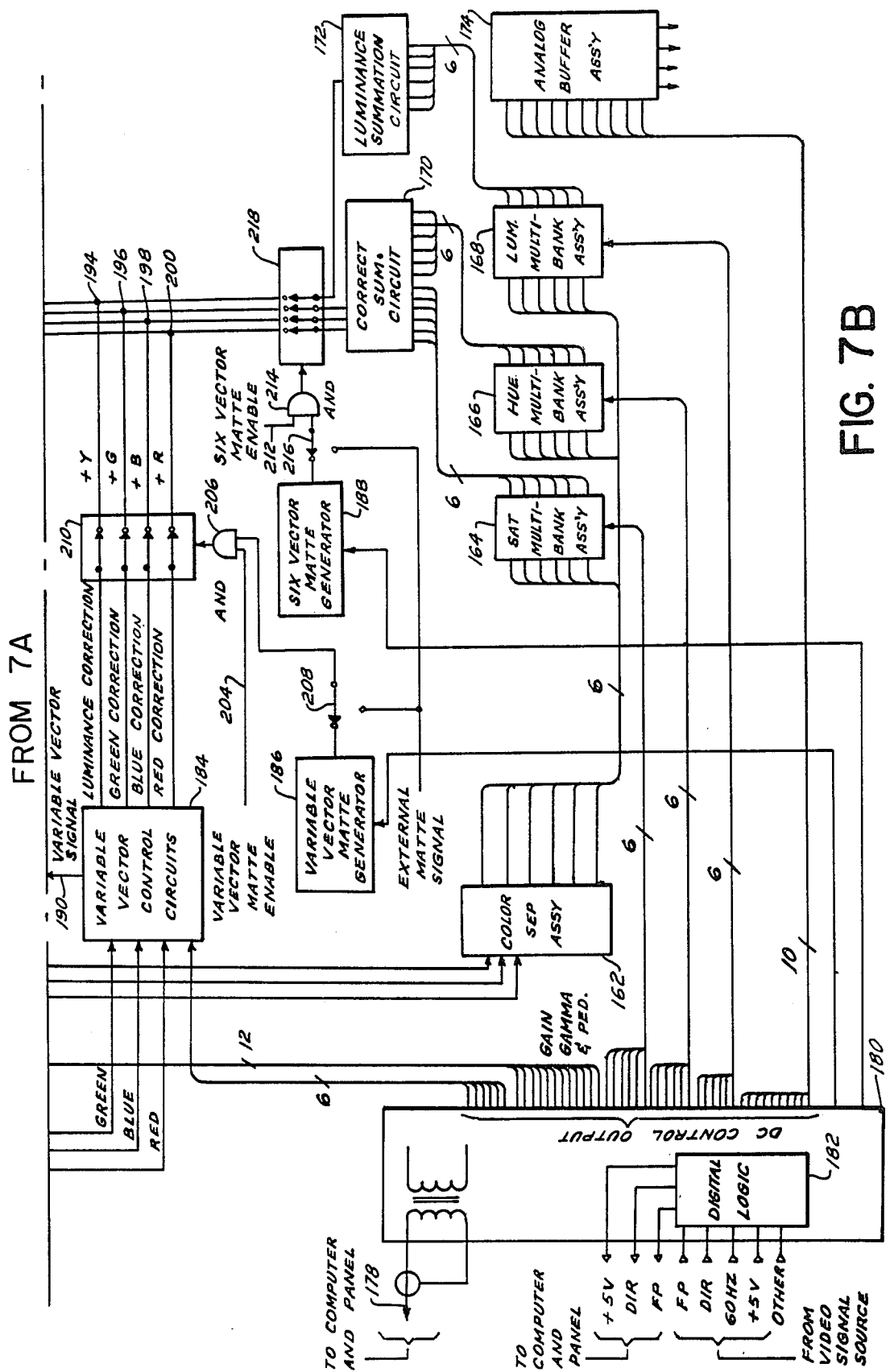

FIGS. 7A and 7B together comprise a block diagram for the color correction circuit of the color corrector 11.

The components 130 through 176 and their interconnections, all shown in FIG. 7A, are described in detail in application Ser. No. 807,815 and that description will not be repeated in detail here Referring now to FIG. 7B, the serial receiver 180 and the digital logic circuits 182 serve the same functions as described in application Ser. No. 807,815, but are modified to receive control signals for the variable vector control circuits 184 as well as control signals for the variable vector matte generator 186 and the six vector matte generator 188. The variable vector control circuits 184 are described in greater detail below in connection with FIGS. 8 and 9. The circuits for the variable vector matte generator 186 and the six vector matte generator 188 are shown and described in U.S. Pat. Nos. 4,679,067 and 4,694,329. Specifically, four programmable counters may be employed for each of the matte generators 186 and 188. The counting information for each of the programmable counters is supplied by the computer 42 over the coaxial cable 178 to the serial receiver 180. The serial receiver then delivers corresponding signals to the matte generator circuits 186 and 188.

In FIG. 7B, the saturation multibank assembly 164 is the circuitry operated by the six control knobs in the top row of knobs on the panel 16 in FIG. 2. Similarly, the hue multibank assembly 166 is controlled by the six knobs in the middle row, and the luminance multibank assembly 168 is controlled by the six knobs in the bottom row of the panel 16. As it is well known, each of the eighteen knobs in the panel controls a parameter for colors within a fixed sector of the color circle represented on a vectorscope screen.

The correction summation circuit 170 sums the signals it receives and produces correction signals for the red ("R"), blue ("B"), and green ("G") signals, while the luminance summation circuit 172 similarly generates a correction signal for the luminance ("Y") signal, as described in application Serial No. 807,815. The magnitudes of the correction signals depend upon the levels of the D.C. signals received from the serial receiver 180. Similarly, the variable vector control circuits 184 provide correction signals for the R, B, G, and Y signals. The variable vector control circuits receive D.C. signals from the serial receiver 180. The magnitudes of the correction signals for the R, B, G, and Y signals depend upon the levels of the associated D.C. signals. The correction signals are identified as the +R, +B, +G, and +Y signals in FIGS. 7A and 7B.

The correction signals from the variable vector control circuits 184 are added to the correction signals from the correction summation circuit 170 and the luminance summation circuit 172 at points 194, 196, 198, and 200. The added correction signals are delivered to the combiner 160 (FIG. 7A), where they are combined with the R, B, G, and Y signals from the processors 142–148 to produce color corrected R, B, and G signals. The color corrected R, B, and G signals are sent from the combiner 160 to an encoder 176, which produces a color corrected composite video signal. The color corrected composite video signal is sent to the main monitor 50 and the video tape recorder 46, as shown in FIG. 1.

The variable vector control circuits 184 output a variable vector signal when the vector determined by the R, B, and G signals at the input is within the range set by the variable vector controls. The variable vector signal is sent over a line 190 to an AND gate 192 (FIG. 7A). The other input to the AND gate 192 is a variable vector "set up" signal from the "set up" pushbutton 92 on the front panel 12. When the "set up" pushbutton is pressed and the variable vector signal is present, the output of the AND gate 192 becomes HIGH and actuates a switching circuit 202. The switching circuit 202 shorts together the R, B, and G output signals from the combiner 160. Accordingly, a neutral gray is produced as the composite video output of the encoder 176. As a result, the operator may observe on the main monitor 50 which colors are within the range set by the variable vector controls. If the colors the operator wants to correct are not within this range, the operator may adjust the variable vector position control 80, the delta control 82, and/or the factor control 84, as discussed previously.

The control knobs are each connected to a circuit that provides a numerical value indicative of the amount of rotation of the knob. It should be understood that this circuit which determines the amount of rotation of one of the control knobs 86, 88, and 90 is automatically reset to zero after each storage of its settings. This operation "zeros" the knobs in preparation for further corrections.

Block Diagrams for the Variable Vector Control Circuits

Figure 9:
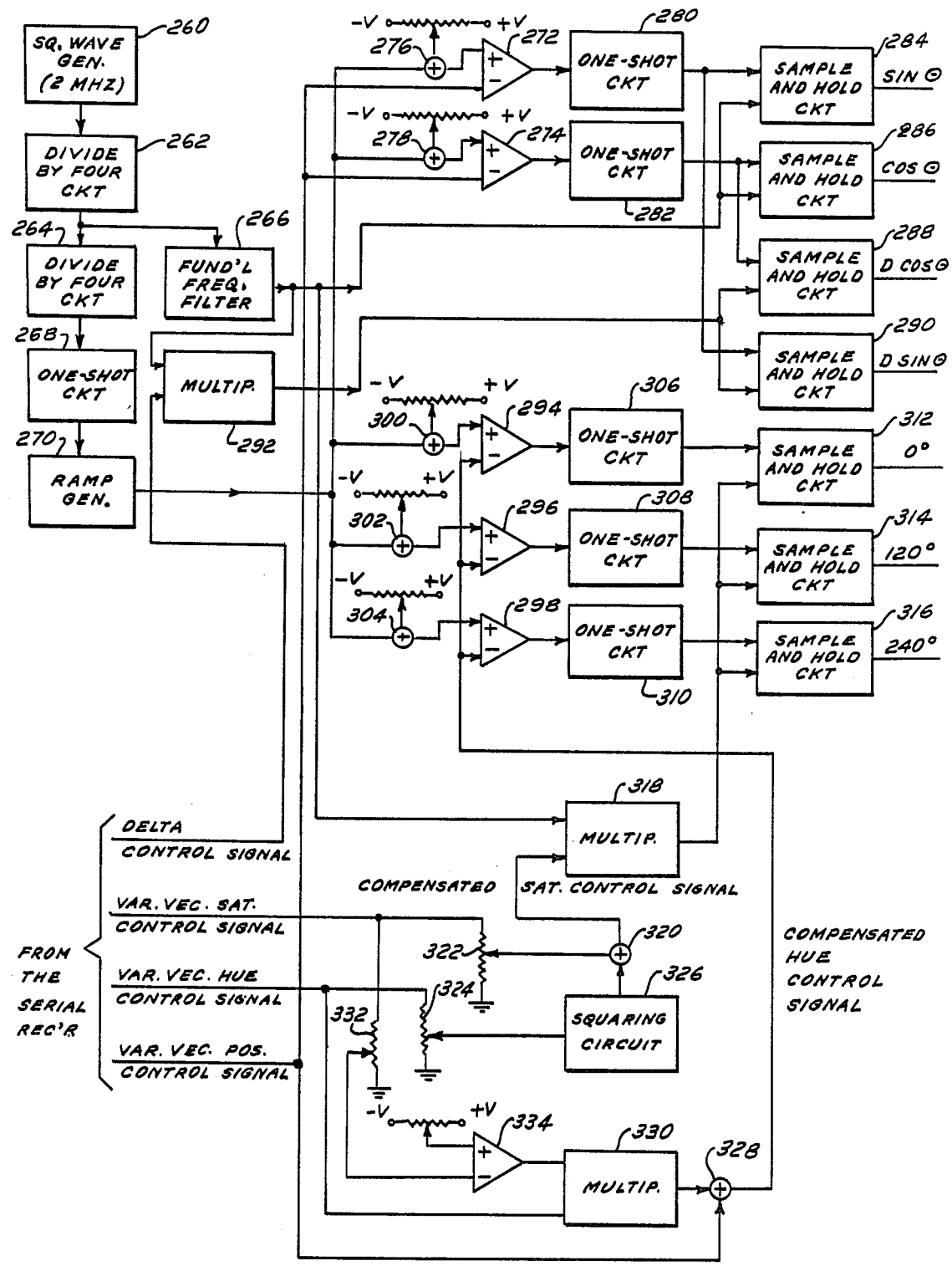
FIG. 9 is a block diagram of a coefficient processor for the variable vector control circuits illustrated in FIG. 8.

FIGS. 8 and 9 are block diagrams for the variable vector control circuits 184 of FIG. 7. In FIG. 8, red ("R"), green ("G"), and blue ("B") signals from the decoder enter a luminance matrix 230 and produce a luminance signal ("Y") at the output of the luminance matrix.

An R-Y signal is one input of a four-quadrant multiplier 232. A B-Y signal is one input of a four-quadrant multiplier 234. The R-Y and B-Y signals are in quadrature. Accordingly, any vector may be selected by taking appropriate portions of the R-Y and B-Y signals. The $\sin\theta$ and $\cos\theta$ signals from the coefficient processor (shown in detail in FIG. 9) are used to select the appropriate portions of the R-Y and B-Y signals. Other signals which are in quadrature, such as the I and Q signals, may be employed, however. The $\sin\theta$ signal is delivered to the other input of the four-quadrant multiplier 232, while the $\cos\theta$ signal is supplied to the other input of the four-quadrant multiplier 234. The output signals from the four-quadrant multipliers 232 and 234 determine the principal color in the range of colors set by the variable vector position control.

The range around this principal color is, however, relatively large. Consequently, the four-quadrant multipliers 238, 240, and 242 are employed to narrow the range. The R-Y signal is one input of the four-quadrant multiplier 238, and the B-Y signal is one input of the four-quadrant multiplier 240. A $D\cos\theta$ signal is the other input of the four-quadrant multiplier 238, and a $D\sin\theta$ signal is the other input of the four-quadrant multiplier 240. The $D\cos\theta$ signal is like the $\cos\theta$ signal except that the amplitude is changed by the value D. Similarly, the $D\sin\theta$ signal is like the $\sin\theta$ signal except that the amplitude is changed by the value D. The output signals from the four-quadrant multipliers 238 and 240 determine a vector which is in quadrature with the vector determined by the output signals from the four-quadrant multipliers 232 and 234.

The vector determined by the output signals from the four-quadrant multipliers 238 and 240 is squared by a four-quadrant multiplier 242 in order to eliminate any negative portions of it. The difference between the output signal from the four-quadrant multiplier 242 and a reference signal is one input of a four-quadrant multiplier 236. The other input of the four-quadrant multiplier 236 is the difference between the output signals from the four-quadrant multipliers 232 and 234. Consequently, the output signal from the four-quadrant multiplier 242 modifies the vector determined by the output signals from the four-quadrant multipliers 232 and 234. In particular, the output signal from the four-quadrant multiplier 242 narrows the range around the principal color. The value D determines the width of the range around the principal color. By changing the value D, the magnitude of the output signal from the four-quadrant multiplier 242 is changed, and a larger or smaller amount is subtracted from the reference signal at the input of the four-quadrant multiplier 236. A explanation of how the value D is obtained is included below during the description of the coefficient processor.

Figure 10:
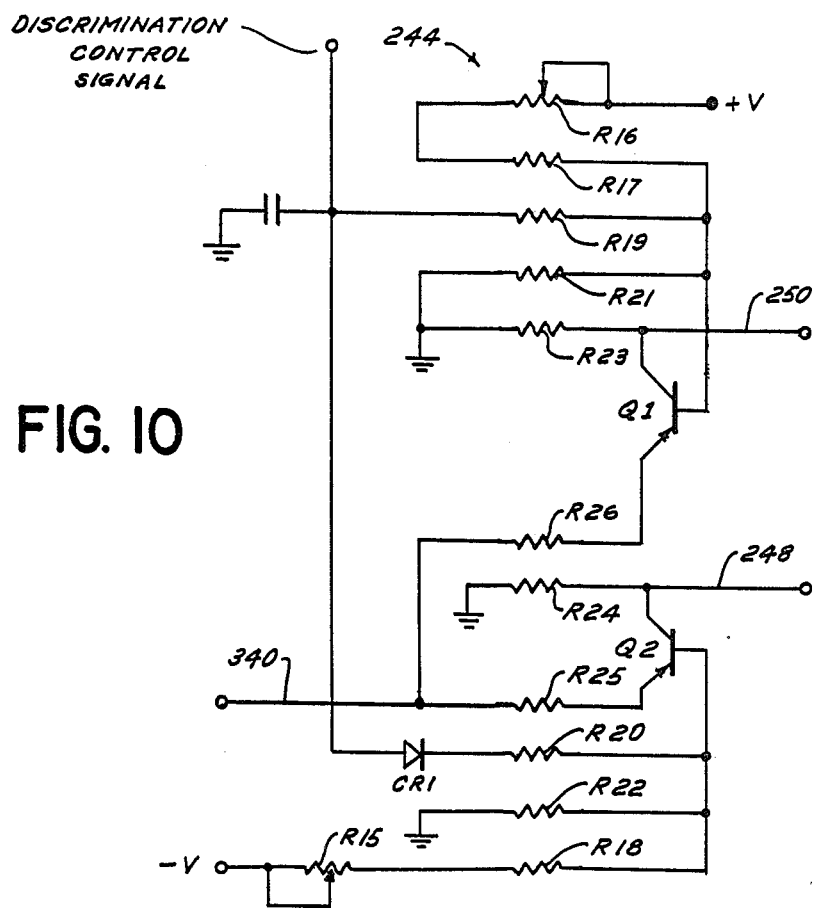
FIG. 10 is a schematic diagram for the level discrimination circuit illustrated in FIG. 8.
Figure 11A:
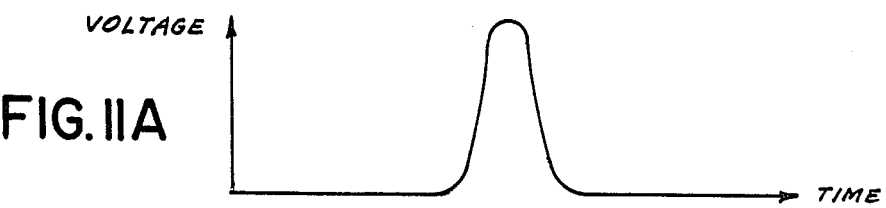
FIGS. 11A–11C are waveform diagrams for the level discrimination circuit illustrated in FIG. 10.
Figure 11B:
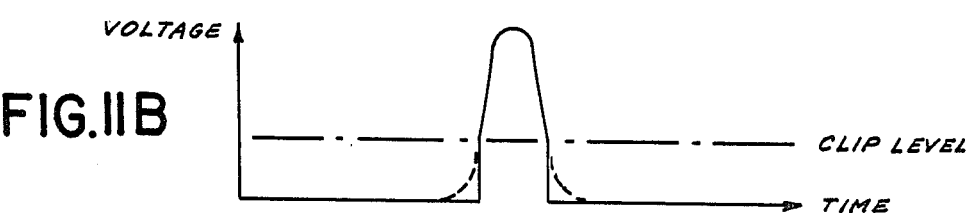
Figure 11C:
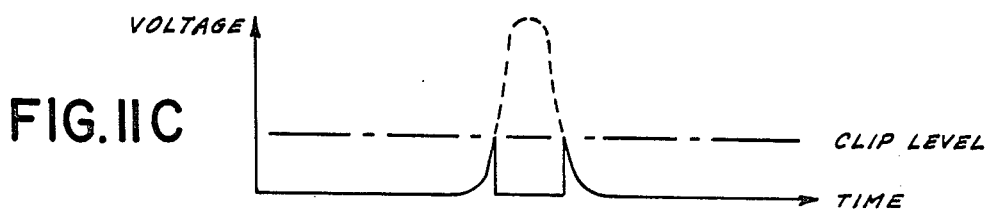

The output signal from the four-quadrant multiplier 236 is sent to a level discrimination circuit 244. The level discrimination circuit 244 is shown in FIG. 10 and described in greater detail below. In short, the level discrimination circuit 244 discriminates signals above a first preset level from signals below the first preset level, and it discriminates signals above a second preset level from signals below the second preset level. Signals above the first preset level are supplied over a line 248 to each of the four-quadrant multipliers 252, 254, 256, and 258. Furthermore signals above the second preset level are delivered over a line 250 to each of the four-quadrant multipliers 252, 254, 256, and 258.

The difference between the signal on the line 248 and the signal on the line 250 is used as one input of each of the four-quadrant multipliers 252, 254, 256, and 258. The other input of each of the four-quadrant multipliers 252, 254, and 256 is provided by the coefficient processor, while the other input of the four-quadrant multiplier 258 is supplied by the serial receiver 180 (FIG. 7B). The coefficient processor delivers signals identified as 0°, 120°, and 240°. These signals resolve the variable vector signal into components corresponding to the R, G, and B signals. The signal from the serial receiver is a luminance correction signal, which corresponds to the position of the variable vector luminance control 90 (FIG. 2) on the front panel 12. This correction signal produces a luminance correction ("+Y") at the output of the four-quadrant multiplier 258. The luminance correction is delivered to the combiner 160 (FIG. 7A).

FIG. 8 depicts an alternative location for the circuit which controls the variable vector window. Namely, a switching circuit 246 is located between the level discrimination circuit 24 and the four-quadrant multipliers 252-258. The switching circuit 246 receives a variable vector matte control signal, such as the output signal from the AND gate 206 (FIG. 7B), which controls whether the +R, G, +B, and +Y correction signals will be supplied to the combiner 160 (FIG. 7A). When the switches in the switching circuit 246 are in the position shown in FIG. 8, the correction signals will be sent to the combiner 160; when the switches are in the other position, the output signals from the discrimination circuit 244 on the lines 248 and 250 are grounded. Consequently, no +R, +G, +B, and +Y signals are developed at the outputs of the four-quadrant multipliers 252–258 and no such correction signals are provided to the combiner 160 when the switching circuit 246 is in its other position. Thus, the variable vector matte control signal enables and disables the variable vector control circuit at the boundaries of the window.

The right-hand portion of FIG. 8 illustrates a wideband differential amplifier 259, which is connected to the output lines of the level discrimination circuit 244 and the switching circuit 246. The amplifier 259 provides the variable vector signal in its output line 190. The variable vector signal is mentioned above during the description of FIGS. 7A and 7B.

As it can be seen from the foregoing description, the circuitry shown in the left-hand portion of FIG. 8 is a versatile, accurate video color detector. Although the foregoing description is adequate, the following supplemental discussion should help in understanding it in even greater depth.

Figure 12:
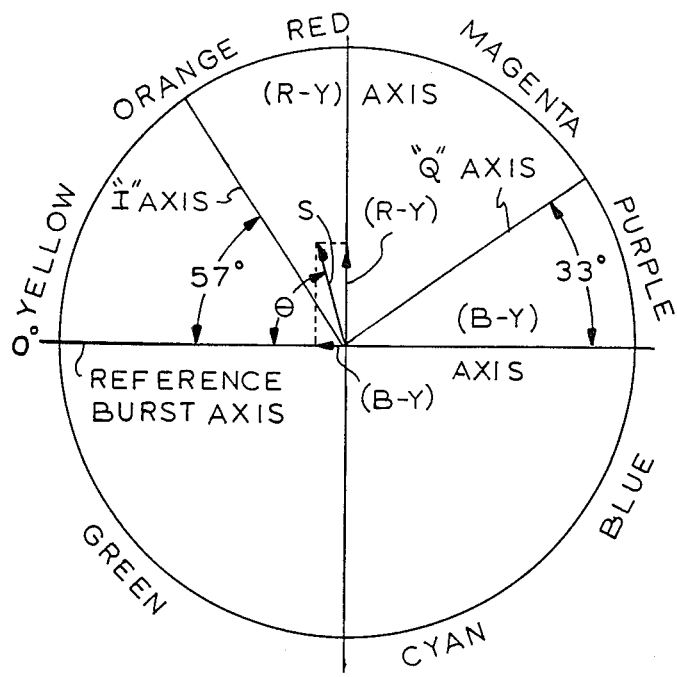
FIG. 12 is a vector diagram representing some of the variables in the operation of the device shown in FIG. 8.

FIG. 12 of the accompanying drawings is a schematic vector representation of the hue and saturation of a given color video signal, as it is shown on the familiar "vectorscope" used in video production equipment. The angle "$\theta$" of the vector represents the hue or color of the signals, and the length "S" of the vector represents the saturation or intensity of the signals.

The color detector circuit of FIG. 8 makes it possible to rotate the vector "S" through an angle of 360° or more so as to select almost any hue as the principal color to be detected. The hue selection control is essentially infinitely variable.

Figure 13:
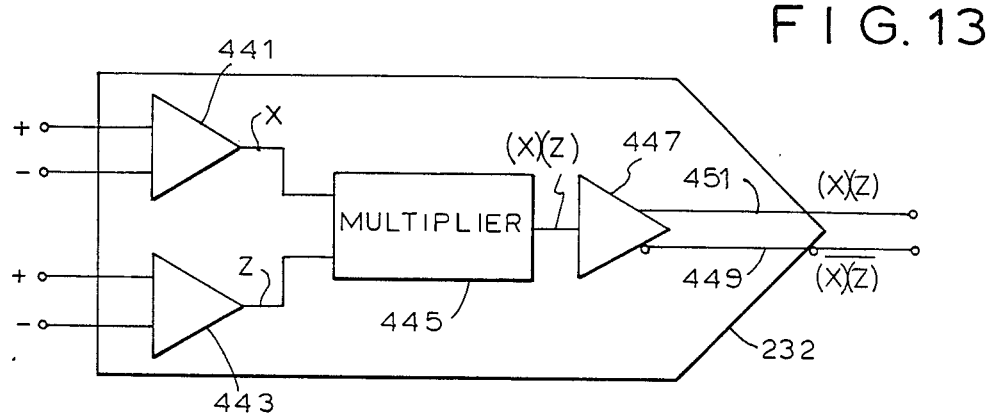
FIG. 13 is a schematic circuit diagram of a component of the device shown in FIG. 8.

The details of the manner in which the foregoing is accomplished can be explained with the further assistance of FIG. 13.

FIG. 13 is an enlarged and more detailed view of the multiplier circuit 232 shown in FIG. 8. The circuit 232 is an integrated circuit including a pair of differential amplifiers 441 and 443 which deliver their outputs to an analog multiplier circuit 445, which delivers to an amplifier 447 a signal proportional to the product of its two input signals $\overline{X}$ and $\overline{Z}$. Amplifier 447 delivers an amplified signal proportional to the product (X)(Z) on one output line 451, and an inverted signal proportional to the product (X) (Z) on another output line 449.

One satisfactory integrated circuit chip for this use is the MC1595L multiplier sold by Motorola, Inc.

Thus, the input signal (R-Y) is formed by the differential amplifier 441, which has (R) applied to its (+) input terminal and (Y) to its (−) terminal.

Each multiplier circuit shown in FIG. 8, that is, each of the multipliers 232, 234, 236, 238, 240, 242, 252, 254, 256, and 258, has the same structure as the multiplier 232 shown in FIG. 13.

Referring again to FIG. 8, in a similar manner, the (B-Y) signal is formed as one input to the four-quadrant multiplier circuit 234. As is shown in FIG. 12, the (R-Y) and (B-Y) signals are defined to be in quadrature. The vector "S" of FIG. 12 is the resultant of the (R-Y) and (B-Y) vector signals. The angle $\theta$ formed by the vector "S" is the measure of the hue of the video signals.

As it has been noted above, the angle $\theta$ corresponding to the hue to be detected by the color detector of FIG. 8 can be selected at any angle from 0° to 360°. This is accomplished, in effect, by the use of a variable, selectable passband filter circuit which filters out all signals other than those within a certain passband around the selected hue corresponding to the angle $\theta$. Thus, the signal (sin $\theta$) is supplied as a second input to the multiplier 232, and the signal (cos $\theta$) is supplied as a second input to the multiplier 234. The output of multiplier 232 is proportional to (R-Y)sin $\theta$, and that from multiplier 234 is proportional to (B-Y)cos $\theta$.

The outputs from multipliers 232 and 234 are delivered to the (+) and (−) input terminals, respectively, of the multiplier circuit 236 so as to form the input signal [(R-Y)sin $\theta$ − (B-Y)cos $\theta$].

Although the resultant color vector detected can be rotated through an angle of 360° or more by varying $\theta$, the operation of the circuit described so far as a color detector is unsatisfactory because the range of hues it recognizes is so broad that it tends to recognize colors substantially different from the principal color.

Figure 14:
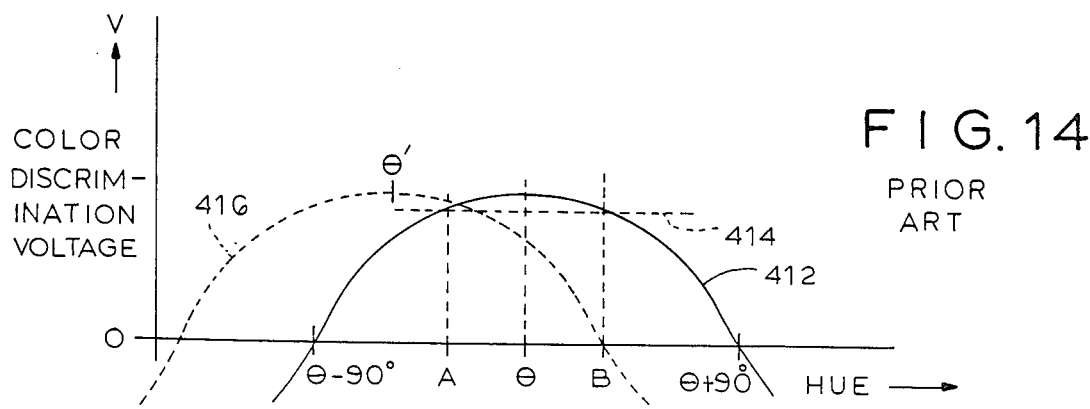
FIG. 14 is a diagram illustrating the operational characteristics of a typical prior art device.

The latter problem is illustrated in FIG. 14 in which the curve 412 expresses the relationship between hue and the output of the multiplier circuit 236 due solely to the input signals described so far; that is, without consideration of the signals applied to the lower pair of terminals of the multiplier circuit 236. The curve 412 is relatively broad and crosses the zero-axis at two points, one of which leads $\theta$ by 90°, and one of which lags $\theta$ by 90°; that is, the curve 412 covers an area spanning 180° of the color spectrum. A second curve is shown at 416. This curve results from a shift of the angle $\theta$ to a new value $\theta'$.

In prior art color detectors, a level detector circuit is used to discriminate against all signals lower in magnitude than a preset level 414. By this means, the range of hues detected by the circuit is narrowed to the area between points A and B, where the preset level 414 crosses the curve 412, without affecting the passband of the detector circuit itself. Because the shape of the curve 412 remains very broad, usually the range of hues between points A and B also is relatively broad. Furthermore, the shape of the curve 412 makes the detector circuit largely dependent on saturation levels rather than hue.

In accordance with a valuable feature of the invention, the passband of the hue selector circuit itself is narrowed by the use of the detector circuit shown in FIG. 8.

With this feature, the passband can be made as narrow as 2° and as broad as 90° on either side of the center, or principal color, substantially independently of the saturation of the input signals.

Multiplier 238 develops a signal of (R-Y) on its upper terminals. A signal (Dcos $\theta$) is developed on its lower terminals by the circuit shown in FIG. 9 which multiplies the cos $\theta$ signal by a "delta" factor "D."

Similarly, (B-Y) and (Dsin $\theta$) signals are developed at the input terminals of the multiplier 240.

The outputs from multipliers 238 and 240 are subtracted from one another by the input differential amplifiers in the multiplier circuit 242 which, as noted above, is used as a squarer. Thus, the quantity [(R-Y)(Dcos $\theta$) − (B-Y)(Dsin $\theta$)] is formed at the output of each input differential amplifier (441 and 443 in FIG. 13) of the circuit 242. Those signals are multiplied by one another (multiplier 445 in FIG. 13) to square that quantity and produce a signal N:

$$N = [(R-Y)(D\cos \theta) - (B-Y)(D\sin \theta)]^2$$

at the output of the squarer 242.

This signal N is sent to the lower negative input terminal of multiplier 236 where it is subtracted from the reference signal "REFERENCE." The resulting signal (1-N) is multiplied with $M=[(R-Y)\sin\theta-(B-Y)\cos\theta]$ and that product is sent to the level discrimination circuit 244.

The effects of this signal processing are shown in FIGS. 15A-15D, which are diagrams illustrating the operation of the circuitry. The angle $\theta$ or hue is plotted horizontally against the D.C. output voltage in response to the successive receipt of numerous signals of equal magnitude but whose hues vary throughout the visible spectrum when a specific center hue $\theta$ has been selected for the passband of the circuit.

Figure 15A:
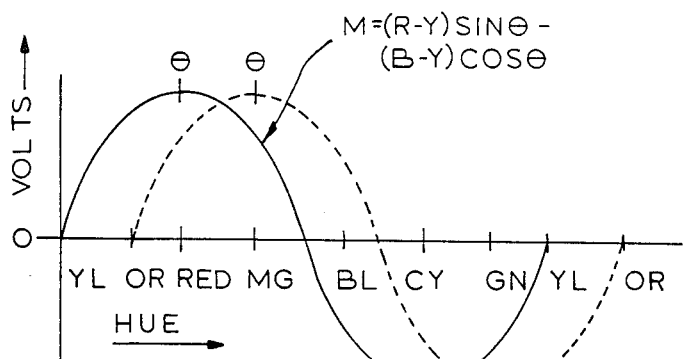
FIGS. 15A–15D are waveform diagrams illustrating the principles of operation of the circuit of FIG. 8.

FIG. 15A shows the variation of the signal $M=[(R-Y)\sin\theta-(B-Y)\cos\theta]$ which is developed at one input of the multiplier 236. It is a sine wave whose period represents 360° of the color vector circle, with the selected hue located at $\theta$, the positive peak of the sine wave.

Figure 15B:
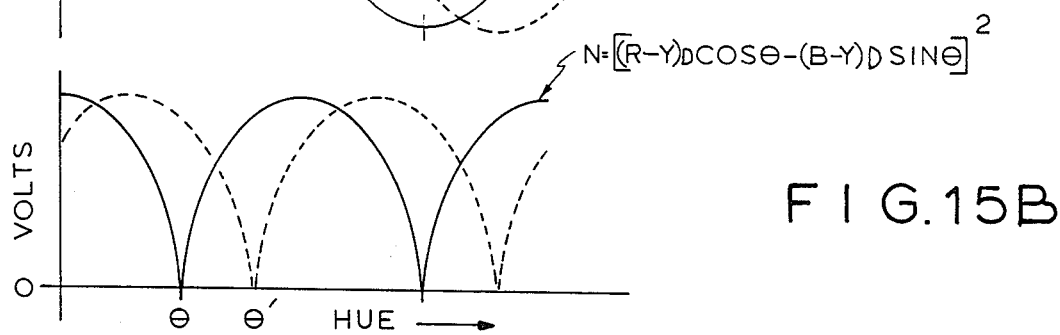

FIG. 15B shows the output of the squarer 242. It is 90° out of phase with the wave shown in FIG. 15A. The purpose of squaring the wave at the input of the squarer 242 is to make all peaks of the wave positive. FIG. 15B basically is made up of positive loops, which have a sine$^2$ form.

Figure 15C:
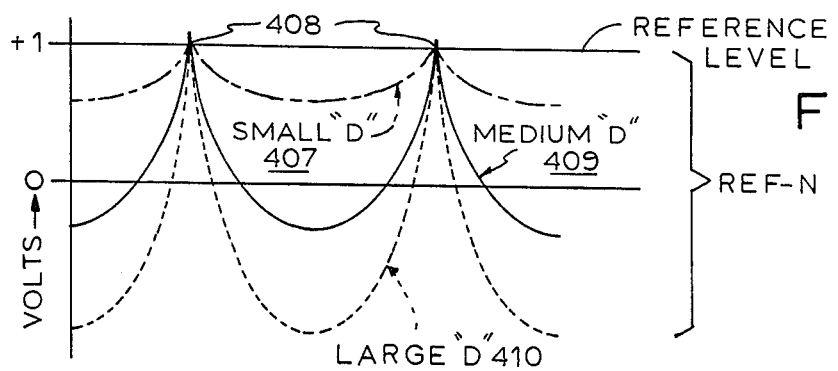

FIG. 15C shows the result of subtracting the signal N shown in FIG. 15B from the reference signal. The reference signal is a D.C. level which preferably is selected to produce a multiplication of one when N=0. The waveform in FIG. 15C has positive-going spikes 408 formed by the cusps between the inverted sine loops formed by the subtraction process.

The effects on the waveforms of a large delta factor "D" and medium and small delta factors are indicated, respectively, by dashed-line curve 410, solid curve 409, and dashed-line curve 407 in FIG. 15C.

Figure 15D:
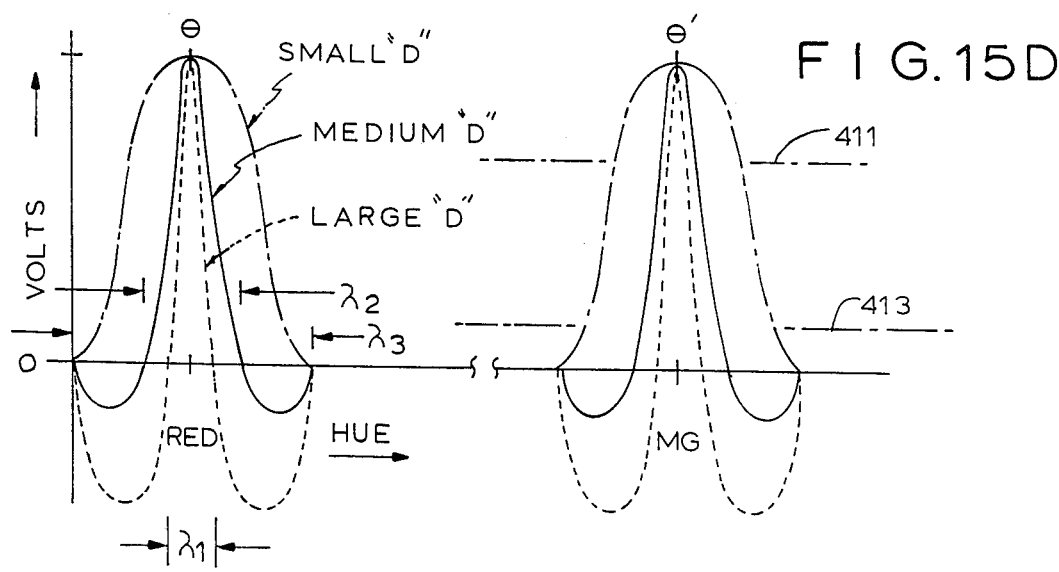

The waveform resulting from multiplying signal M (FIG. 15A) by the signal shown in FIG. 15C is shown in solid lines in FIG. 15D. The negative-going portion of the waveform between the first and third half-cycles is eliminated by a negative signal clipper in the level discriminator circuit 244, so that only positive peaks remain.

The waveforms in FIG. 15D also express the transmission characteristics for input signals of variable hue. That is, signals having a phase angle equal to $\theta$, the selected phase angle defining the desired hue, are transmitted with maximum values; other signals are attenuated to a degree depending upon the shape of the transmission curve, which depends on the delta "D" factor and the number of degrees that the signal is distant from $\theta$.

It can be seen in FIG. 15D that, as the delta factor "D" is increased, the passband $\lambda_1$ of the circuit decreases. With a large "D" factor, the passband $\lambda_1$ is relatively small. $\theta$ is the center frequency or hue of all of the passbands. The passband $\lambda_2$ formed by the use of a medium "D" factor is wider, thus providing for the detection of a wider range of hues around the center hue at $\theta$. Finally, the passband $\lambda_3$ formed by a small "D" factor is very wide, almost 180°.

FIGS. 15A, 15B, and 15D show the waveforms resulting from a change of the selected hue from $\theta$ to $\theta'$. The waveform for $\theta$ has been omitted from FIG. 15C to avoid cluttering the drawing, and the waveform for $\theta'$ in FIG. 15D has been separated from the waveform for $\theta$ more than it actually would be for the sake of clarity in the drawings.

It can be seen that the change of the selected hue from $\theta$ to $\theta'$ merely shifts the waveforms to the right in FIGS. 15A-15D. This changes the selected hue from near red to a hue around magenta. If the knob 80 (FIG. 2) is turned in the opposite direction by the same amount as it was turned to created the change from $\theta$ to $\theta'$, shifting the vector "S" counterclockwise from the reference burst axis (see FIG. 12), then the waveforms shift to the left by a corresponding amount to select a color between green and cyan. The angle $\theta$ can be changed in very small steps or increments, thus making the hue selection essentially infinitely variable.

The amplitude of the signal transmitted to the level discrimination circuit 244 is proportional to the saturation of the color being detected. The level discriminator circuit 244 is capable of rejecting all signals whose saturation falls either above or below a preset level such as levels 411 and 413 shown in the right-hand portion of FIG. 15D.

By setting the discrimination circuit 244 to pass only those signals whose saturation is below a certain level, the device 244 detects and differentiates low-saturation signals from high-saturation signals of the same hue.

Quite significantly, low-saturation colors can be detected without any significant degradation of selectivity in color detection. If preferred for a particular job, high-saturation colors also can be detected for color correction, and the saturation selection process avoids the possibility of developing a detection signal in response to the detection of a signal of the same hue but lower saturation.

By permitting the passband to thus be variable in both phase angle and width, the detector circuit can be adjusted to select virtually any hue, any one of a number of different saturation levels, and a passband width so as to adjust the detector to compensate for varying conditions, and to eliminate or alleviate many of the problems mentioned above with prior color detection devices.

FIG. 9 is a block diagram of the coefficient processor. The delta control signal, the variable vector saturation control signal, the variable vector hue control signal, and the variable vector position control signal are supplied to the coefficient processor by the serial receiver 180. Each signal corresponds to the position of the associated control on the front panel 12, or an associated signal from the memory in the computer. Specifically, variable vector position control signal corresponds to the position of the variable vector position control 80; the delta control signal corresponds to the position of the delta control 82; the variable vector saturation control signal corresponds to the position of the saturation control 86; and the variable vector hue control signal corresponds to the position of the hue control 88. These signals are employed with the circuits shown in FIG. 9 to produce the $\sin\theta$, $\cos\theta$, $D\cos\theta$, $D\sin\theta$, 0°, 120°, and 240° D.C. output signals from the coefficient processor.

The coefficient processor includes a square wave generator 260, which produces a 2-MHz square wave signal. The 2-MHz signal from the square wave generator 260 is sent to a divide-by-four circuit 262. The output of the divide-by-four circuit 262 is sent to another divide-by-four circuit 264 and to a fundamental frequency filter 266. The output signal from the divide-by-four circuit 264 is delivered to a one-shot circuit 268, which triggers a ramp generator 270. The output signal from the fundamental frequency filter 266 is a 500-KHz sine wave, while the output signal from the ramp generator is a ramp. The ramp extends for four cycles of the 500-KHz sine wave.

In order to develop the sinθ and cosθ signals, the variable vector position control signal is compared to two different reference signals at the comparators 272 and 274. The variable vector position control signal is delivered to the minus input of each of the comparators 272 and 274. The plus inputs of the comparators 272 and 274 are supplied by the summation circuits 276 and 278, respectively. The summation circuit 276 adds the ramp signal to a reference signal, while the summation circuit 278 adds the ramp signal to a different reference signal. The two different reference signals are selected to correspond to a difference of 90 degrees along the 500-KHz sine wave. Accordingly, the output signals from the comparators 272 and 274 change from positive to negative at points 90 degrees apart along the sine wave produced by the fundamental frequency filter 266.

The output signals from the comparators 272 and 274 trigger the one-shot circuits 280 and 282, respectively. The one-shot circuits 280 and 282, in turn, trigger the sample-and-hold circuits 284 and 286, respectively. The sample-and-hold circuits 284 and 286 sample the 500-KHz sine wave from the fundamental frequency filter 266. Because the reference signals at the summation circuits 276 and 278 were set to correspond to a 90-degree difference, the sample-and-hold circuits 284 and 286 sample the 500-KHz sine wave at points which are 90 degrees apart. As a result, the sample-and-hold circuits 284 and 286 output signals which have a phase difference of 90 degrees, and these D.C. signals are referred to as sinθ and cosθ.

The variable vector position control signal determines when the outputs of the comparators 272 and 274 change from positive to negative. Consequently, the variable position control signal determines the sinθ and cosθ signals, and thereby sets the principal color in the range of colors selected by the variable vector controls.

The sample-and-hold circuits 288 and 290 operate similarly to the sample-and-hold circuits 284 and 286 in order to determine the Dcosθ and Dsinθ signals. However, the sample-and-hold circuits 288 and 290 do not sample the 500-KHz sine wave from the output of the fundamental frequency filter 266. Rather, the sample-and-hold circuits 288 and 290 sample the output signal from a multiplier 292. One input of the multiplier 292 is the 500-KHz sine wave from the fundamental frequency filter 266, while the other input of the multiplier 292 is the delta control signal. Accordingly, the output signal from the multiplier 292 is a 500-KHz sine wave which has its amplitude modified by the delta control signal.

When the one-shot circuits 280 and 282 trigger the sample-and-hold circuits 284 and 286, the one-shot circuits 280 and 282 simultaneously trigger the sample-and-hold circuits 288 and 290. Thus, the sample-and-hold circuits 288 and 290 sample a 500-KHz sine wave whose amplitude has been modified by the delta control signal to produce the Dcosθ and Dsinθ signals, respectively. The delta control signal, therefore, determines the value D, which sets the width of the range of colors around the principal color.

The comparators 294-298, the summation circuits 300-304, the one-shot circuits 306-310, and the sample-and-hold circuits 312-316 operate like the circuits described above to produce the 0°, 120°, and 240° output signals. However, the sample-and-hold circuits 312-316 do not sample the 500-KHz sine wave from the output of the fundamental frequency filter 266. Instead, the sample-and-hold circuits 312-316 sample the output of the multiplier 318, which is also a 500-KHz sine wave. The 500-KHz sine wave output of the multiplier 318 is derived from the 500-KHz sine wave output of the fundamental frequency filter 266. One input of the multiplier 318 is the 500-KHz sine wave from the fundamental frequency filter 266. The other input of the multiplier 318 is a compensated saturation control signal. The compensated saturation control signal modifies the amplitude of the 500-KHz sine wave from the fundamental frequency filter 266 to produce the output signal for the multiplier 318.

The compensated saturation control signal is developed at the output of the summation circuit 320. One input of the summation circuit 320 is provided by the potentiometer 322, which delivers a portion of the variable vector saturation control signal to the summation circuit 320. In order to generate the other input for the summation circuit 320, a portion of the variable vector hue control signal is supplied by a potentiometer 324 to a squaring circuit 326. The squaring circuit 326 squares the input signal and delivers an output signal to the summation circuit 320. The output of the summation circuit 320 is a saturation control signal which has been corrected for changes in the hue control signal. Therefore, the hue of the variable vector may be changed without altering the saturation of the variable vector.

The sample-and-hold circuits 312-316 sample a 500-KHz sine wave whose amplitude has been modified by the compensated saturation control signal, as noted above. The one-shot circuits 306-310 trigger the sample-and-hold circuits 312-316, respectively, and the one-shot circuits 306-310 are triggered when the output signals from the comparators 294-298, respectively, change from negative to positive. The plus inputs of the comparators 294-298 are supplied by the summation circuits 300-304, respectively. One input of each of the summation circuits 300-304 is supplied by the ramp generator 270, while the other input is a reference signal. The reference signals for the summation circuits 300-304 are set so that the sample-and-hold circuits 312-316 sample the output of the multiplier 318 at points which are 120 degrees apart along the associated sine wave. The minus inputs of the comparators 294-298 are provided with a compensated hue control signal.

The compensated hue control signal is developed at the output of a summation circuit 328. One input of the summation circuit 328 is the variable vector position control signal, and the other input the summation circuit 328 is from a multiplier 330. A portion of the variable vector saturation control signal is sent by a potentiometer 332 to the minus input of a comparator 334. The plus input of the comparator 334 is a reference signal. The difference between the reference signal and the portion of the variable vector saturation control signal is delivered to one input of the multiplier 330. The variable vector hue control signal is furnished for the other input of the multiplier 330. Accordingly, the multiplier 330 produces as an output a hue control signal which has been corrected for changes in the saturation control signal. Thus, the saturation of the variable vector may be changed without altering the hue of the variable vector.

The output signal from the multiplier 330 is sent to one input of the summation circuit 328. The summation circuit 328 adds this signal to the variable vector position control signal and delivers its output signal to the minus inputs of the comparators 294–298. Consequently, the ramp-plus-reference signals at the outputs of the summation circuits 300–304 are compared to the compensated hue control signal. The compensated hue control signal corresponds to the position of the hue corrected variable vector. The ramp-plus-reference signals are used to resolve the hue corrected variable vector signal into its R, G, and B components.

The ramp-plus-reference signals together with the summation circuits 300–304, the comparators 294–298, the one-shot circuits 306–310, and the sample-and-hold circuits 312–316 cause the 0°, 120°, and 240° signals to be 120 degrees from one another since reference signals are set appropriately. Hence, the hue corrected variable vector signal may be resolved into its R, G and B components. The compensated saturation control signal varies the amplitude of the sine wave sampled by the circuits 312–314 Thus, the compensated saturation control signal changes the magnitudes of the 0°, 120°, and 240° signals to provide a correction for the saturation level of the variable vector signal.

Level Discrimination Circuit

FIG. 10 is a schematic diagram for the level discrimination circuit 244 shown in FIG. 8. The signal from the output of the four-quadrant multiplier 236 enters the level discrimination circuit 244 on a line 340. This signal travels through a resistor R26 to the emitter of a transistor Q1 and through a resistor R25 to the emitter of a transistor Q2. The base of the transistor Q1 is biased by the potentiometer R16 and the resistors R17, R19, R21, and R23 to prevent the conduction of all signals from the emitter to the collector when the discrimination control signal is zero or positive. The base of the transistor Q2 is biased by the potentiometer R15 and the resistors R18, R20, R22 and R24 to permit the conduction of all signals from the emitter to the collector if the discrimination control signal is zero. A diode CR1 prevents the bias of the transistor Q2 from being changed by the discrimination control signal when the discrimination control signal is negative.

The bias for the transistor Q1 establishes one discrimination level, and the bias for the transistor Q2 establishes another discrimination level. The level set by the bias circuit for the transistor Q1 is higher than the level set by the bias circuit for the transistor Q2. Signals below the associated discrimination level are prevented from passing to the output, while signals above the associated discrimination level are passed to the output.

If the discrimination control signal is zero, the transistor Q1 passes no signals because the associated discrimination level is relatively high, and the transistor Q2 passes all positive signals because the associated discrimination level is zero. Accordingly, the signal on line 248 minus the signal on line 250 has a waveform like that shown in FIG. 11A when the input signal to the color correction circuit is provided by a device which generates a spectrum of color signals.

As the discrimination control signal becomes increasingly positive from zero, the discrimination levels associated with the transistors Q1 and Q2 increase. The transistor Q1 passes no signals because the associated discrimination level is even higher than it was for a zero discrimination control signal. The transistor Q2 passes only signals above the associated discrimination level. Consequently, the signal on line 248 minus the signal on line 250 has a waveform like that shown in FIG. 11B. The discrimination level for the transistor Q2 is determined by the discrimination control signal, which affects the bias of the transistor Q2 through the resistor R20.

As the discrimination control signal becomes increasingly negative from zero, the discrimination level associated with the transistor Q1 decreases, but the discrimination level associated with the transistor Q2 remains at zero due to the diode CR1. The transistor Q1 passes only signals above the associated discrimination level. The transistor Q2 passes all positive signals. As a result, the signal on line 248 minus the signal on line 250 has a waveform like that shown in FIG. 11C. The discrimination level for the transistor Q1 is determined by the discrimination control signal, which affects the bias of the transistor Q1 through the resistor R19.

The sign and the magnitude of the discrimination control signal may be adjusted by the operator with the factor control 84 (FIG. 2) on the front panel 12 of the color corrector 11. For instance, a clockwise rotation of the factor control 84 may correspond to a positive discrimination control signal, and a counterclockwise rotation of the factor control 84 may correspond to a negative discrimination control signal. The amount of rotation, clockwise or counterclockwise, sets the magnitude of the discrimination control signal.

The factor control 84 and the level discrimination control circuit 244 provide the operator with greater selectivity for the color correction of particular objects. For instance, if two objects in the video picture are approximately the same color, but one has a relatively high saturation level and the other has a relatively low saturation level, the operator may select one of the objects to receive color corrections by suitably adjusting the factor control 84. The video picture signals for the other object will not receive the color corrections. More specifically, the operator may distinguish a light blue sky from a dark blue shirt with the factor control 84 even though these two objects have the same hue. Then, color corrections may be developed for the selected object. Because of this ability, the overall quality of the color corrected videotape is improved since the operator may develop color corrections not previously possible.

OTHER VARIATIONS

Even though the color corrector 11 is shown with one set of variable vector controls, the color corrector may be equipped with two or more sets of variable vector controls. Accordingly, two or more principal colors may be selected, one principal color by each set of variable vector controls. In fact, a color corrector may have a sufficient number of variable vector controls to allow the elimination of the six-vector controls 16 (FIG. 2). However, the combination of the six-vector controls with the variable vector controls in a single color corrector is particularly advantageous. The six-vector controls usually provide separation of the color corrections from one another which is adequate for most color correction jobs. Since the use of the dedicated knobs of the six-vector controls can be quite fast, the speed of operation of the equipment using both types of controls can be fast as well as high quality.

While the level discrimination circuit is shown and described in connection with the variable vector control circuit, one or more of the color correction circuits for red, green, blue, magenta, yellow, and cyan may be furnished with such a level discrimination circuit.

The coefficient processor is illustrated and explained with analog signal processing circuits, but a suitably programmed general purpose computer or microprocessor may be employed in lieu of the analog signal processing circuits. In addition, digital circuits may be used for other components in the variable vector control circuits.

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims.

I claim:

1. A color correction system for color correcting video picture signals representative of images stored in an image recording medium and displayed as video pictures by a first display means, comprising:
   color correction means for selectively generating color correction signals for at least one selected frame of each of a plurality of scenes recorded on said image recording medium;
   storage means for storing said color correction signals;
   second display means for displaying a plurality of pictures, each picture corresponding to the video picture signals for one of said selected frames; and
   recall means for recalling from storage the color correction signals for a selected one of said frames displayed by said second display means.

2. A system as recited in claim 1, including identifying indicia for identifying each of the pictures displayed by said second display means, said recall means being adapted to utilize said identifying indicia to recall the color corrections for the picture identified.

3. A system as recited in claim 1, further comprising means for selectively displaying the pictures corresponding to selected frames simultaneously by said first display means.

4. A system as recited in claim 1, wherein the picture for a first selected frame and the picture for a second selected frame are selectively displayed next to each other by said second display means, whereby a comparison of the two pictures is easily accomplished.

5. A system as recited in claim 1, wherein the means for recalling the color correction signals for said selected frames is selected from the group consisting of a touch screen, a light pen, a cursor, and a plurality of switches, each switch being assigned to a particular one of the pictures displayed by second display means.

6. A system as recited in claim 1, further comprising means for selectively modifying said color correction signals recalled from storage.

7. A system as recited in claim 1, wherein said second display means has a display screen which is divided into a plurality of zones, wherein a switch is associated with each zone, and wherein said recall means is responsive to a selected switch to recall the color correction signals corresponding to the picture in the zone associated with said selected switch.

8. A system as recited in claim 1, further comprising:
   video picture storage means for storing information for reproducing said plurality of video pictures; and
   means for recalling video picture information from said video picture storage means.

9. A system as recited in claim 8, wherein information for a color-corrected video picture from a given scene is automatically stored in said video picture storage means when a new scene is established.

10. A system as recited in claim 8, wherein said video picture storage means and said recall means are selectively operable.

11. A system as recited in claim 8, wherein video picture information recalled from said video picture storage means is displayed by said first display means.

12. A method for color correcting video picture signals representative of images stored in an image recording medium, comprising the steps of:
   producing video picture signals representative of each of the images stored in the image recording medium;
   displaying pictures corresponding to each of the images stored in the image recording medium by a first display means;
   selectively generating color correction signals for at least one selected frame of each of a plurality of scenes recorded on said image recording medium;
   storing said color correction signals;
   displaying by a second display means a plurality of pictures, each picture corresponding to the video picture signals for one of said selected frames; and
   recalling from storage the color correction signals for a selected one of said selected frames displayed by said second display means.

13. A method as recited in claim 12, wherein identifying indicia identify each of the pictures displayed by said second display means, and wherein the recalling step includes using said identifying indicia to recall the color correction signals for the picture identified.

14. A method as recited in claim 12, further comprising the step of selectively displaying the pictures corresponding to selected frames simultaneously by said first display means.

15. A method as recited in claim 12, further comprising the step of selectively displaying the picture for a first selected frame and the picture for a second selected frame next to each other by said second display means.

16. A method as recited in claim 12, wherein the recalling step includes using a signal from a device selected from the group consisting of a touch screen, a light pen, a cursor, and a plurality of switches, each switch being assigned to a particular one of the pictures displayed by the second display means, to recall the color correction signals.

17. A method as recited in claim 12, further comprising the step of selectively modifying said color correction signals read from storage.

18. A method as recited in claim 12, further comprising the steps of dividing a display screen for the second display means into a plurality of zones, associating a switch with each zone, and wherein the recalling step is accomplished in response to a signal from a selected switch.

19. Video signal color correction apparatus comprising, in combination, a color correction computer including means for developing color correction signals for video signals from a video source, memory means for storing signals corresponding to said color correction signals and location signals indicating the location of corrected pictures relative to other pictures in a video program sequence, and for storing signals representative of each of a plurality of said corrected pictures, and display means for displaying each of said corrected pictures and means for recalling from said memory means and applying to other pictures the signals corresponding to color correction signals for a selected one of said corrected pictures.

20. Apparatus as in claim 19 including means for applying, under the control of said location signals, the stored signals corresponding to the correction signals to signals from said video source during replay of said program sequence to produce a color-corrected program sequence.

21. Apparatus as in claim 19 in which said display means includes at least one monitor and includes means for displaying simultaneously a plurality of said corrected pictures on said monitor.

22. A color correction system for color correcting video picture signals representative of images stored in an image recording medium and displayed as video pictures on a display means, comprising:
   means for selecting a predetermined range of colors with a principal color selectable from any hue;
   color correction means for selectively generating color correction signals for the video picture signals corresponding to said predetermined range of colors;
   storage means for storing said color correction signals;
   scene location means for producing location signals representative of the location of an initial image of each of a plurality of scenes recorded on said image recording medium;
   means for storing said location signals in said storage means;
   readout means for reading from said storage means said color correction signals and said location signals;
   combining means, responsive to the location signals read from said storage means, for selectively combining color correction signals read from said storage means with said video picture signals; and
   means for selectively identifying the color correction signals for a particular scene with one of the video pictures in said particular scene, and wherein said readout means is responsive to said identifying means.

23. A system as recited in claim 22, wherein the selecting means includes means for adjusting the size of the predetermined range of colors.

24. A system as recited in claim 22, further comprising discrimination means for discriminating video picture signals forming a specific area of the picture from video picture signals forming the remainder of the picture, said specific area being smaller than the area of the entire picture, and wherein said combining means is responsive to said discrimination means and selectively combines the color correction signals read from said storage means with said video picture signals in an area defined by said specific area.

25. A system as recited in claim 22, further comprising means for discriminating from the video picture signals corresponding to the predetermined range of colors those video picture signals having a saturation level less than a predetermined value, and wherein the color correction means generates color correction signals for the discriminated signals.

26. A system as recited in claim 25, wherein the predetermined value is adjustable.

27. A system as recited in claim 22, further comprising means for discriminating from the video picture signals corresponding to the predetermined range of colors those video picture signals having a saturation level greater than a predetermined value, and wherein the color correction means generates color correction signals for the discriminated signals.

28. A system as recited in claim 27, wherein the predetermined value is adjustable.

29. A system as recited in claim 22, wherein the selecting means includes means for selecting a first predetermined range of colors with a first principal color selectable from any hue and means for selecting a second predetermined range of colors with a second principal color selectable from any hue, and wherein the correction signal developing means includes means for developing first correction signals for the video picture signals corresponding to the first predetermined range of colors and means for developing second correction signals corresponding to the second predetermined range of colors.

30. A system as recited in claim 22, further comprising additional color correction means for selectively generating additional color correction signals for the video picture signals corresponding to red, green, blue, magenta, yellow, and cyan, and wherein the storage means stores said additional color correction signals.

31. A system as recited in claim 22, wherein said identifying means includes a monitor, said monitor being divided into a plurality of zones, said video pictures being displayed in said zones.

32. A system as recited in claim 31, wherein said identifying means includes a plurality of switches, each one of said switches being uniquely associated with each one of said zones.

33. A system as recited in claim 31, wherein said identifying means includes means for displaying on said monitor alphanumeric information corresponding to said video pictures.

34. A method for color correcting video picture signals representative of images stored in an image recording medium and displayed as video pictures on a display means, comprising the steps of:
   selecting a predetermined range of colors with a principal color selectable from any hue;
   selectively generating color correction signals for the video picture signals corresponding to said predetermined range of colors;
   storing said color correction signals in a storage means;
   producing location signals representative of the location of an initial image of each of a plurality of scenes recorded on said image recording medium;
   storing said location signals in said storage means;
   reading from said storage means said color correction signals and said location signals;
   selectively combining color correction signal read from said storage means with said video picture signals; and
   selectively identifying the color correction signals for a particular scene by means of one of the video pictures in said particular scene.

35. A method as recited in claim 34, wherein the identifying step includes displaying each of said video pictures in one of a plurality of zones on a monitor.

36. A method as recited in claim 35, wherein the identifying step includes displaying on said monitor alphanumeric information corresponding to said video pictures.

* * * * *